US011644098B2

United States Patent
Fukuda et al.

(10) Patent No.: US 11,644,098 B2
(45) Date of Patent: May 9, 2023

(54) HYDRAULIC SYSTEM OF WORK MACHINE AND WORK MACHINE

(71) Applicant: Kubota Corporation, Osaka (JP)

(72) Inventors: Yuji Fukuda, Sakai (JP); Kazuyoshi Arii, Sakai (JP); Ryohei Sumiyoshi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 38 days.

(21) Appl. No.: 17/124,492

(22) Filed: Dec. 17, 2020

(65) Prior Publication Data

US 2021/0102626 A1 Apr. 8, 2021

Related U.S. Application Data

(62) Division of application No. 16/833,689, filed on Mar. 30, 2020, now Pat. No. 10,900,562, which is a (Continued)

(30) Foreign Application Priority Data

Dec. 7, 2015 (JP) ................................. 2015-238561
Sep. 27, 2016 (JP) ................................. 2016-188002

(51) Int. Cl.
  *E02F 9/22* (2006.01)
  *F15B 11/00* (2006.01)
  (Continued)

(52) U.S. Cl.
  CPC ....... *F16H 61/4035* (2013.01); *E02F 9/2285* (2013.01); *F15B 11/20* (2013.01);
  (Continued)

(58) Field of Classification Search
  CPC ............... E02F 9/2207; E02F 9/2257; F15B 2211/30505; F15B 2211/7053;
  (Continued)

(56) References Cited

U.S. PATENT DOCUMENTS 3,996,744 A    12/1976  Ridge
5,034,892 A *  7/1991   Saotome ............... E02F 9/2207
                                                         91/464
(Continued)

FOREIGN PATENT DOCUMENTS

EP    2466153      6/2012
JP    S646402 U *  1/1989
(Continued)

OTHER PUBLICATIONS

JP S646402 U machine translation to English (Year: 1989).*
(Continued)

*Primary Examiner* — Kenneth Bomberg
*Assistant Examiner* — Michael Quandt
(74) *Attorney, Agent, or Firm* — Mori & Ward, LLP

(57) ABSTRACT

A hydraulic system of a work machine includes a first hydraulic device to operate in a first operation mode while pressure of hydraulic oil supplied from a hydraulic pump via a first oil passage is equal to or higher than a first pressure threshold. The hydraulic oil in the first oil passage is to be discharged via a second oil passage. A pilot check valve is provided in the second oil passage and has a pilot port to receive a pilot pressure of the hydraulic oil. The pilot check valve is closed to stop discharging the hydraulic oil in the first oil passage through the second oil passage while the pilot pressure is lower than the fourth pressure threshold. The pilot check valve is opened while the pilot pressure is higher than or equal to the fourth pressure threshold. The first hydraulic device is a ride control device.

5 Claims, 13 Drawing Sheets

Related U.S. Application Data division of application No. 15/369,890, filed on Dec. 6, 2016, now Pat. No. 10,641,388.

(51) Int. Cl.

| | |
|---|---|
| *F16H 61/4035* | (2010.01) |
| *F16H 61/44* | (2006.01) |
| *F15B 11/20* | (2006.01) |
| *F16H 61/423* | (2010.01) |
| *F16H 61/433* | (2010.01) |
| *F16H 61/4157* | (2010.01) |
| *B60K 17/10* | (2006.01) |

(52) U.S. Cl.
CPC .............. *F16H 61/44* (2013.01); *B60K 17/10* (2013.01); *F15B 11/003* (2013.01); *F15B 2211/20576* (2013.01); *F15B 2211/3058* (2013.01); *F15B 2211/30505* (2013.01); *F15B 2211/30525* (2013.01); *F15B 2211/329* (2013.01); *F15B 2211/355* (2013.01); *F15B 2211/613* (2013.01); *F15B 2211/6355* (2013.01); *F15B 2211/7053* (2013.01); *F15B 2211/7058* (2013.01); *F15B 2211/71* (2013.01); *F15B 2211/7741* (2013.01); *F15B 2211/782* (2013.01); *F16H 61/4157* (2013.01); *F16H 61/423* (2013.01); *F16H 61/433* (2013.01)

(58) Field of Classification Search
CPC .......... F15B 2211/30515; F15B 11/003; F15B 13/01; B60G 17/005; B60G 17/056; B60G 2204/46

See application file for complete search history.

(56) References Cited

U.S. PATENT DOCUMENTS

| | | | |
|---|---|---|---|
| 5,351,601 A | 10/1994 | Zeuner et al. | |
| 6,092,454 A | 7/2000 | Vande Kerckhove | |
| 8,276,705 B2 | 10/2012 | Sumiyoshi et al. | |
| 8,495,870 B2 | 7/2013 | Sumiyoshi et al. | |
| 8,762,001 B2* | 6/2014 | Matsuzaki | B60G 17/005 701/38 |
| 9,316,310 B2 | 4/2016 | Kinugawa et al. | |
| 2004/0088972 A1* | 5/2004 | Harnischfeger | E02F 9/2207 60/469 |
| 2015/0013322 A1* | 1/2015 | Ito | F15B 11/003 60/459 |
| 2015/0315768 A1 | 11/2015 | Jeong et al. | |

FOREIGN PATENT DOCUMENTS

| | | |
|---|---|---|
| JP | 2006-028935 | 2/2006 |
| JP | 2007-016484 | 1/2007 |
| JP | 2013-036276 | 2/2013 |

OTHER PUBLICATIONS

Japanese Office Action for corresponding JP Application No. 2016-188002, dated Dec. 20, 2019 (w/ machine translation).

Election of Species requirement issued by the U.S. Patent and Trademark Office for the U.S. Appl. No. 15/369,890, dated Mar. 21, 2019.

Office Action with Form PTO-892 Notice of References Cited issued by the U.S. Patent and Trademark Office for the U.S. Appl. No. 15/369,890, dated Jun. 21, 2019.

Office Action issued by the U.S. Patent and Trademark Office for the U.S. Appl. No. 15/369,890, dated Sep. 20, 2019.

Advisory Action issued by the U.S. Patent and Trademark Office for the U.S. Appl. No. 15/369,890, dated Dec. 11, 2019.

Notice of Allowance issued by the United States Patent and Trademark Office for the U.S. Appl. No. 15/369,890, dated Feb. 26, 2020.

Restriction Requirement issued by the U.S. Patent and Trademark Office for the parent U.S. Appl. No. 16/833,689, dated Sep. 4, 2020.

Office Action with Form PTO-892 Notice of References Cited issued by the U.S. Patent and Trademark Office for the parent U.S. Appl. No. 16/833,689, dated Oct. 6, 2020.

Notice of Allowance issued by the United States Patent and Trademark Office for the parent U.S. Appl. No. 16/833,689, dated Dec. 3, 2020.

* cited by examiner ized axial motor (HST motor). The hydraulic system has a speed changing mechanism that can change the speed of the HST motor. The speed changing mechanism includes a direction switching valve, a hydraulic switching valve whose position is switched by the direction switching valve, and a swash-plate switching cylinder that is connected to the hydraulic switching valve and the HST motor. The speed changing mechanism first stretches or contracts the swash-plate switching cylinder by changing the position of the hydraulic switching valve by using the direction switching valve. When the swash-plate switching cylinder stretches or contracts, an angle of the swash plate of the HST motor changes, and thus the HST motor is switched to the first speed or the second speed.

HYDRAULIC SYSTEM OF WORK MACHINE AND WORK MACHINE

CROSS-REFERENCE TO RELATED APPLICATIONS

The present application is a divisional application of the U.S. patent application Ser. No. 16/833,689 filed Mar. 30, 2020, which is a divisional application of the U.S. patent application Ser. No. 15/369,890 filed Dec. 6, 2016, which was issued as U.S. Pat. No. 10,641,388, which claims priority under 35 U. S. C. § 119 to Japanese Patent Application No. 2015-238561, filed Dec. 7, 2015, Japanese Patent Application No. 2016-188002, filed Sep. 27, 2016. The contents of these applications are incorporated herein by reference in their entirety.

BACKGROUND OF THE INVENTION

Field of the Invention

The present invention relates to a hydraulic system of a work machine and to a work machine.

Discussion of the Background

Conventionally, a hydraulic system that shifts gears by using a variable displacement hydraulic motor in a work machine such as a skid steer loader or a compact track loader is known (see JP 2013-36276 A).

The hydraulic system disclosed in JP 2013-36276 A is a system that shifts gears by using a swash-plate variable displacement axial motor (HST motor). The hydraulic system has a speed changing mechanism that can change the speed of the HST motor. The speed changing mechanism includes a direction switching valve, a hydraulic switching valve whose position is switched by the direction switching valve, and a swash-plate switching cylinder that is connected to the hydraulic switching valve and the HST motor. The speed changing mechanism first stretches or contracts the swash-plate switching cylinder by changing the position of the hydraulic switching valve by using the direction switching valve. When the swash-plate switching cylinder stretches or contracts, an angle of the swash plate of the HST motor changes, and thus the HST motor is switched to the first speed or the second speed.

SUMMARY OF THE INVENTION

According to one aspect of the present invention, a hydraulic system of a work machine includes a hydraulic pump, a first hydraulic device, a first oil passage, a second oil passage, a pilot check valve, a third oil passage, a first actuator, a hydraulic actuator, and an operation control valve. The hydraulic pump is to discharge hydraulic oil. The first hydraulic device is to operate in a first operation mode while pressure of the hydraulic oil supplied from the hydraulic oil is equal to or higher than a first pressure threshold. The first oil passage connects the first hydraulic device and the hydraulic pump. The hydraulic oil is to be supplied to the first hydraulic device from the hydraulic pump via the first oil passage. The second oil passage is connected to the first oil passage. The hydraulic oil in the first oil passage is to be discharged via the second oil passage. The pilot check valve is provided in the second oil passage and has a pilot port to receive a pilot pressure of hydraulic oil. the pilot pressure is controlled to be a pressure lower than a fourth pressure threshold when an operation mode of the first hydraulic device is changed to the first operation mode. The pilot check valve is closed to stop discharging the hydraulic oil in the first oil passage through the second oil passage while the pilot pressure is lower than the fourth pressure threshold. The pilot valve is opened such that the hydraulic oil in the first oil passage is discharged through the second oil passage while the pilot pressure is higher than or equal to the fourth pressure threshold. The third oil passage is connected to the pilot port. The first actuator is to control an amount of hydraulic oil flowing to the third oil passage. The operation control valve is to control an operation of the hydraulic actuator. The first hydraulic device is a ride control device to perform a vibration control operation to suppress a pressure fluctuation of the hydraulic actuator in accordance with the pressure of the hydraulic oil. The first actuator is a remote control valve connected to the operation control valve to control the pressure of the hydraulic oil in accordance with an operation of an operating member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
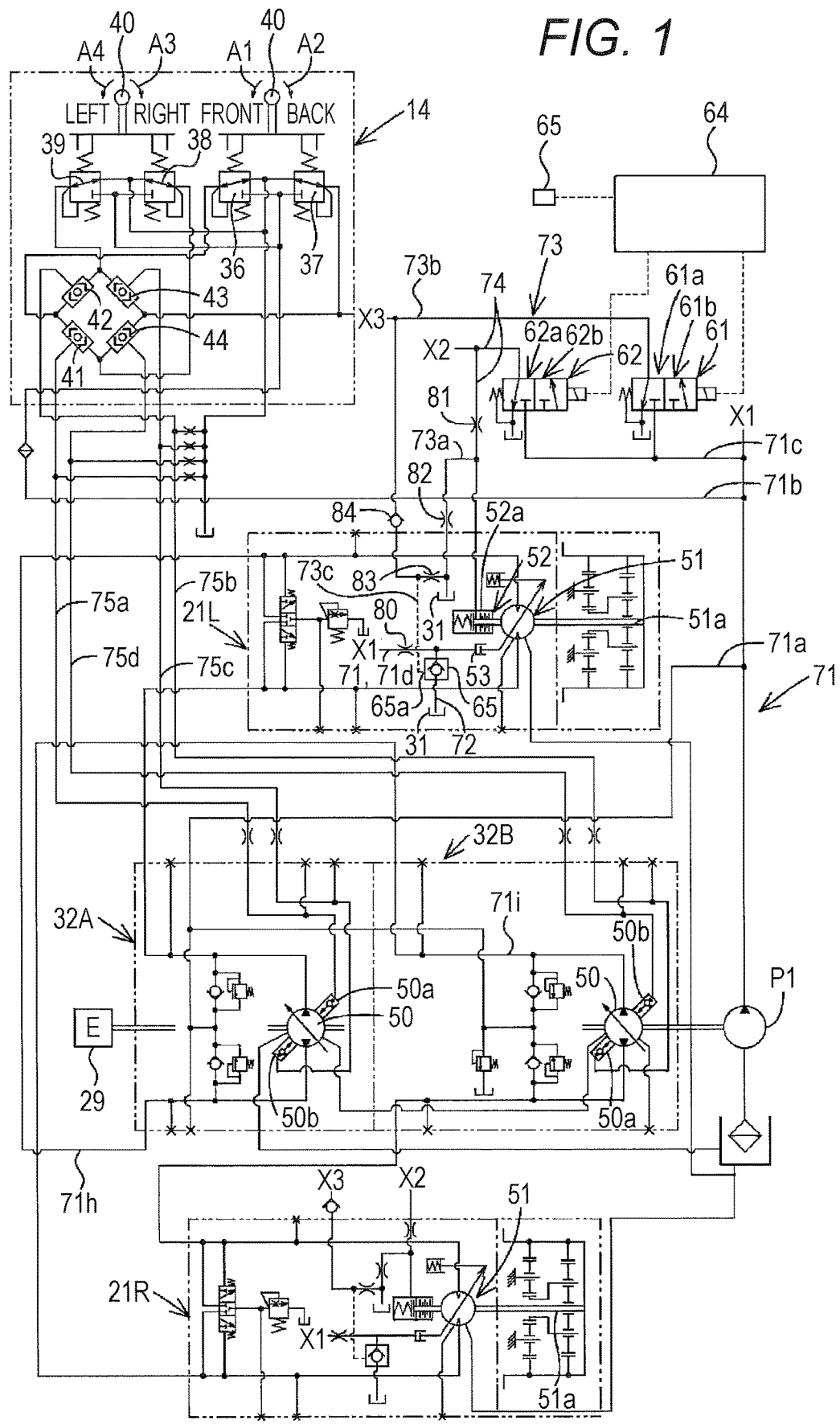
FIG. 1 is a diagram illustrating a hydraulic system (hydraulic circuit) according to a first embodiment.

The embodiments will now be described with reference to the accompanying drawings, wherein like reference numerals designate corresponding or identical elements throughout the various drawings.

Hereinafter, embodiments of a hydraulic system of a work machine and a work machine including the hydraulic system according to the present invention will be described with reference to the drawings.

First Embodiment

First, an overall configuration of a work machine is described.

Figure 12:
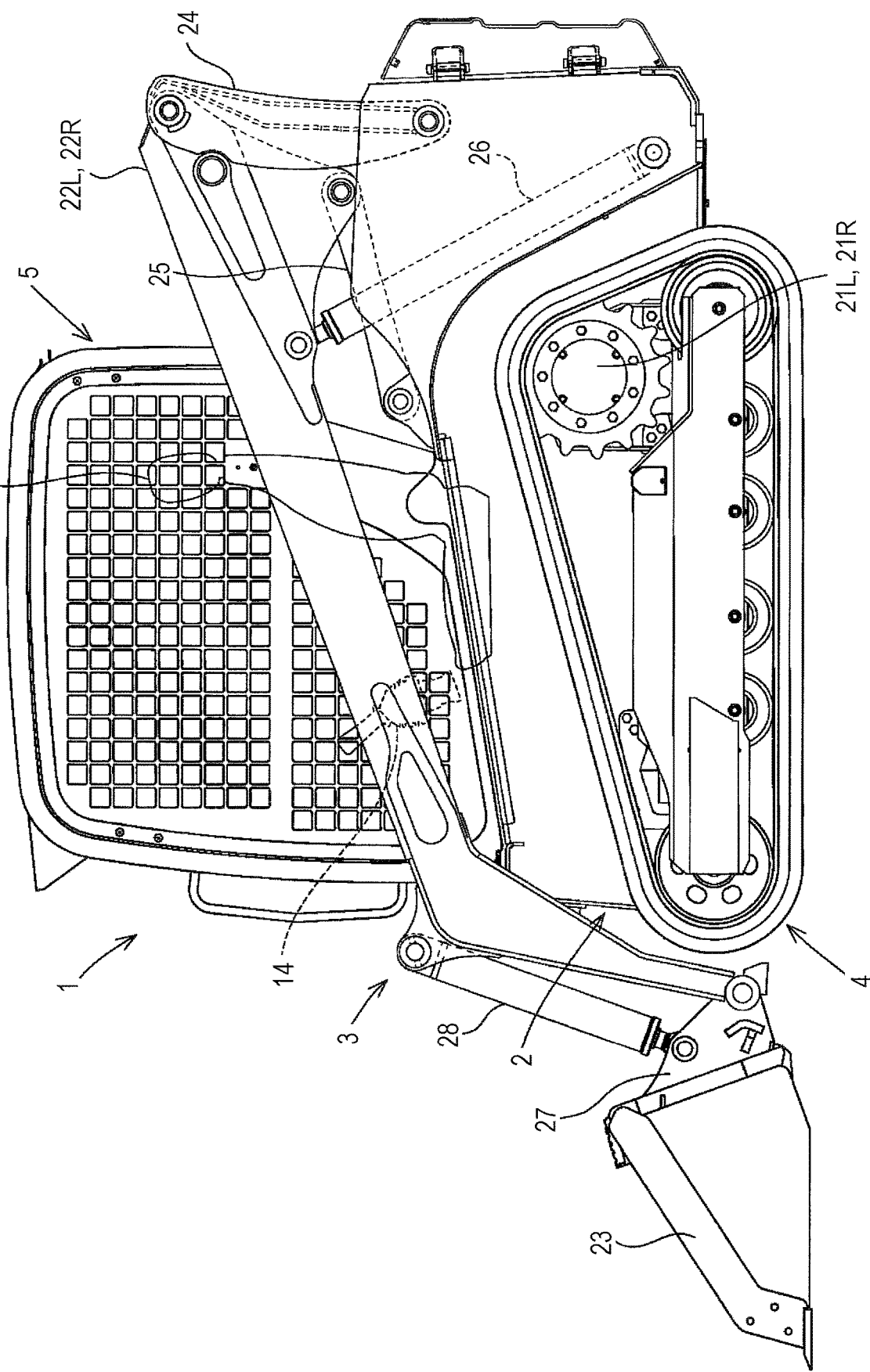
FIG. 12 is a side view illustrating a track loader that is an example of a work machine.
Figure 13:
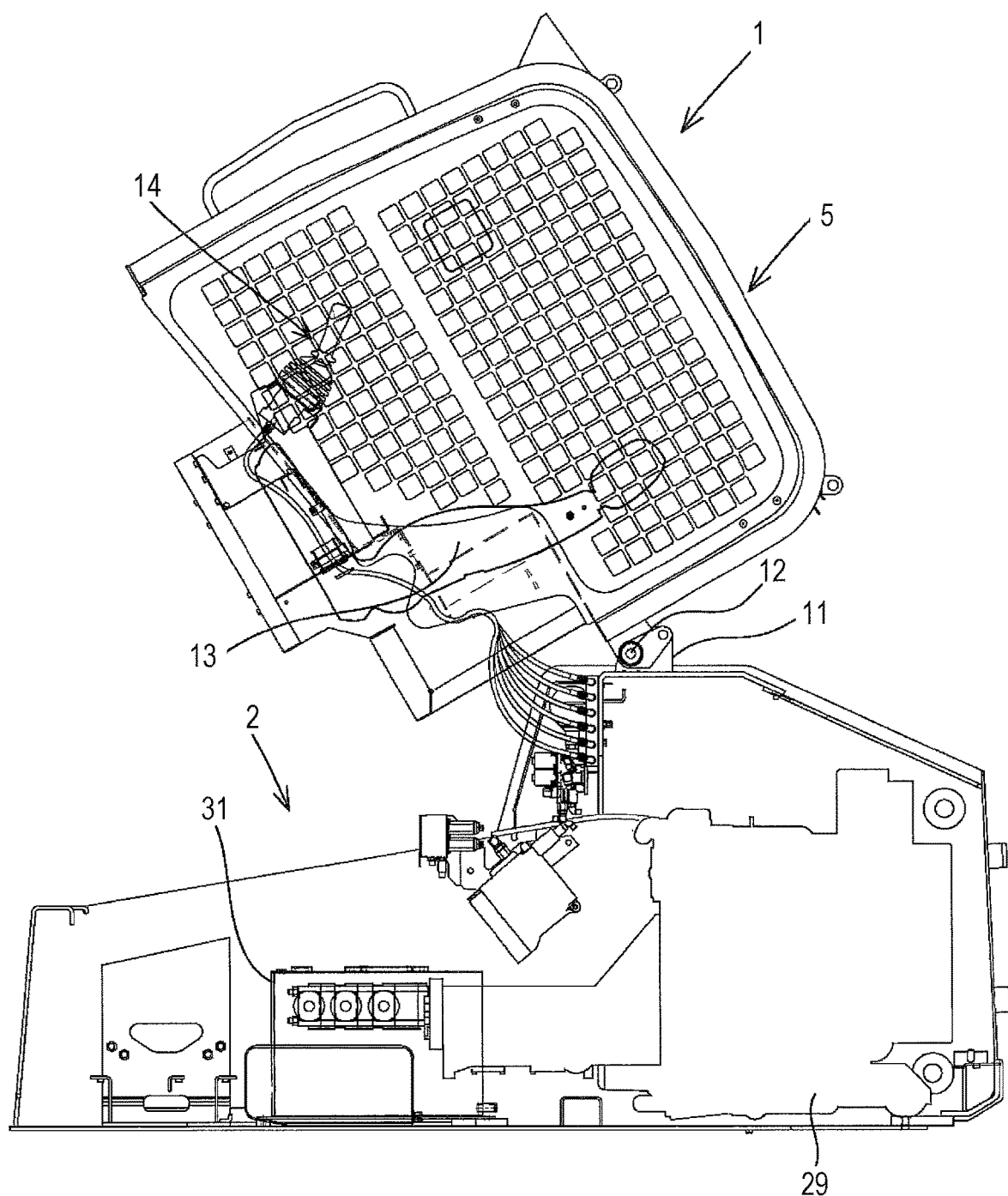
FIG. 13 is a side view illustrating part of a track loader in a state where a cabin is raised.

A work machine 1 according to the embodiments of the present invention includes a frame 2, a working device 3 attached to the frame 2, and a travelling device 4 that supports the frame 2, as illustrated in FIGS. 12 and 13. Although a track loader is illustrated as an example of the work machine in FIGS. 12 and 13, the work machine according to the embodiments of the present invention is not limited to a track loader and can be, for example, a tractor, a skid steer loader, a compact track loader, or a backhoe. The embodiments of the present invention are described assuming that a front side (left side in FIG. 12) of a driver sitting on a driver's seat of the work machine is a forward direction, a rear side (right side in FIG. 12) of the driver is a backward direction, a left side (near side in FIG. 12) of the driver is a leftward direction, and a right side (far side in FIG. 12) of the driver is a rightward direction.

A cabin 5 is mounted in an upper front part of the frame 2. A rear part of the cabin 5 is supported by a supporting bracket 11 of the frame 2 so as to be swingable around a supporting shaft 12. A front part of the cabin 5 can be placed on a front part of the frame 2.

A driver's seat 13 is provided in the cabin 5. An operation device for travelling 14 for operating the travelling device 4 is disposed on one side (e.g., left side) of the driver's seat 13.

The travelling device 4 is realized by a crawler-type travelling device. The travelling devices 4 are provided below the frame 2 on the left and right of the frame 2. The travelling device 4 has a first travelling part 21L and a second travelling part 21R that work by hydraulic driving and is configured to be able to travel by the first travelling part 21L and the second travelling part 21R.

The working device 3 includes a boom 22L, a boom 22R, and a bucket 23 (working tool). The boom 22L is disposed on the left of the frame 2. The boom 22R is disposed on the right of the frame 2. The boom 22L and the boom 22R are linked to each other by a link. The boom 22L and the boom 22R are supported by a first lift link 24 and a second lift link 25. A lift cylinder 26, which is realized by a double-acting pressure cylinder, is provided between base sides of the boom 22L and the boom 22R and a lower rear part of the frame 2. The boom 22L and the boom 22R swing up or down when the lift cylinders 26 stretch or contract concurrently. An attachment bracket 27 is pivotably supported by a front end side of each of the boom 22L and the boom 22R so as to be rotatable about a horizontal shaft, and a rear surface side of the bucket 23 is attached to the attachment brackets 27 provided on the left and right.

A tilt cylinder 28, which is realized by a double-acting pressure cylinder, is provided between the attachment brackets 27 and intermediate parts of the boom 22L and the boom 22R on front end sides thereof. The bucket 23 swings (scoops or dumps) when the tilt cylinder 28 stretches or contracts.

The bucket 23 is detachably attached to the attachment brackets 27. By detaching the bucket 23 and attaching various attachments (hydraulically-driven working tool having a hydraulic actuator that will be described later) to the attachment brackets 27, various works other than digging (or a different kind of digging operation) can be performed. A prime mover 29 is provided on a rear side of the frame 2. The prime mover 29 is an engine. Note that the prime mover 29 may be an electric motor or may be one that has both an engine and an electric motor. Furthermore, a tank (hydraulic oil tank) 31 in which hydraulic oil is stored is provided in the frame 2.

Next, a hydraulic system of the work machine according to the embodiments of the present invention is described below.

FIG. 1 is an overall view of a hydraulic system of a travelling system.

As illustrated in FIG. 1, the hydraulic system (hydraulic circuit) has a first hydraulic pump P1. The first hydraulic pump P1 is a hydraulic pump that is driven by power of the engine 29 to discharge hydraulic oil and is, for example, realized by a fixed displacement gear pump. The first hydraulic pump P1 is mainly used for supply of a control signal (pilot pressure). For convenience of description, hydraulic oil discharged from the first hydraulic pump P1 or hydraulic oil for a control signal is hereinafter sometimes referred to as pilot oil, and the pressure of pilot oil is hereinafter sometimes referred to as pilot pressure. Note that the hydraulic system has a second hydraulic pump (not illustrated). The second hydraulic pump is a pump that mainly supplies hydraulic oil to a hydraulic system of a work system. The lift cylinder 26, the tilt cylinder 28, and the like work by the hydraulic oil discharged from the second hydraulic pump.

The hydraulic system (hydraulic circuit) includes a first driving circuit 32A and a second driving circuit 32B. The first driving circuit 32A is a circuit that drives the first travelling part 21L provided on the left, and the second driving circuit 32B is a circuit that drives the second travelling part 21R provide on the right.

The first driving circuit 32A and the second driving circuit 32B each include an HST pump (travelling pump) 50. The HST pumps 50 are connected to respective travelling motors 51 of the first and second travelling parts 21L and 21R by a pair of oil passages for gear shift 71h and 71i. Note that the second driving circuit 32B has an identical structure to the first driving circuit 32A and therefore description thereof is omitted.

The HST pump 50 is a swash-plate variable displacement axial pump that is driven by power of the engine 29 and is a pilot-type hydraulic pump (swash-plate variable displacement hydraulic pump) in which an angle of a swash plate is changed by pilot pressure. Specifically, the HST pump 50 includes a pressure receiving part (a pilot port) for forward travelling 50a and a pressure receiving part (a pilot port) for backward travelling 50b on which the pilot pressure acts.

The angle of the swash plate is changed by the pilot pressure that acts on the pressure receiving parts 50a and 50b. When the angle of the swash plate changes, a direction and an amount of discharge of hydraulic oil changes, and thus rotation output of the first and second travelling parts 21L and 21R changes. When the rotational speed of the HST pump 50 increases, the amount of discharge of the HST pump 50 increases, and the travelling speed increases accordingly. The rotational speed of the HST pump 50, i.e., the amount of discharge of the HST pump 50 changes depending on output of the engine 29.

The hydraulic system has a first hydraulic device whose operation mode can be changed in a case where the pressure of the hydraulic oil becomes equal to or higher than a predetermined value (a first pressure threshold). In the present embodiment, the first hydraulic device is the travelling motor (hydraulic motor for travelling) 51 provided in each of the first travelling part 21L and the second travelling part 21R. The travelling motor 51 is a travelling motor (HST motor) whose speed can be changed by the pressure of the hydraulic oil and works by the hydraulic oil discharged from the HST pump 50. The travelling motor 51 is, for example, a swash-plate variable displacement axial motor that can be shifted to two speeds, i.e., high speed and low speed.

The travelling motor 51 can be operated by a travelling operation device 14. The travelling operation device 14 has a remote control valve for forward travelling 36, a remote control valve for backward travelling 37, a remote control valve for rightward turn 38, a remote control valve for leftward turn 39, a travelling lever 40, which is an operating member, and first through fourth shuttle valves 41, 42, 43, and 44. The remote control valves (first actuators) 36, 37, 38, and 39 are operated by a common, i.e., single travelling lever 40. To the remote control valves 36, 37, 38, and 39, the hydraulic oil discharged from the first hydraulic pump P1 is supplied. The pressure of the hydraulic oil supplied to the remote control valves 36, 37, 38, and 39 changes in accordance with an operation of the travelling lever (operating member) 40.

The travelling lever 40 is tiltable from a neutral position in forward and backward direction, a width direction orthogonal to the forward and backward directions, and oblique directions. By tilting the travelling lever 40, the remote control valves 36, 37, 38, and 39 of the travelling operation device 14 are operated. As a result, pilot pressure that is proportional to the amount of operation of the travelling lever 40 from the neutral position is output from secondary-side ports of the remote control valves 36, 37, 38, and 39. That is, the remote control valves 36, 37, 38, and 39 are realized by proportional valves. Note that the remote control valves need not be proportional valves, as long as the pressure of hydraulic oil changes in accordance with an operation of the travelling lever (operating member) 40.

In a case where the travelling lever 40 is tilted forward (in a direction indicated by arrow A1 in FIG. 1), the remote control valve for forward travelling 36 is operated, and pilot pressure is output from the remote control valve 36. This pilot pressure acts on the pressure receiving part for forward travelling 50a of the first driving circuit 32A after travelling from the first shuttle valve 41 through a first operation oil passage 75a and acts on the pressure receiving part for forward travelling 50a of the second driving circuit 32B after travelling from the second shuttle valve 42 through a second operation oil passage 75b. As a result, output shafts 51a of the first travelling part 21L and the second travelling part 21R normally rotate (rotate forwardly) at a speed that is proportional to an amount of tilt of the travelling lever 40, and thus the track loader 1 travels straight in the forward direction.

In a case where the travelling lever 40 is tilted backward (in a direction indicated by arrow A2 in FIG. 1), the remote control valve for backward travelling 37 is operated, and pilot pressure is output from the remote control valve 37. This pilot pressure acts on the pressure receiving part for backward travelling 50b of the first driving circuit 32A after travelling from the third shuttle valve 43 through a third operation oil passage 75c and acts on the pressure receiving part for backward travelling 50b of the second driving circuit 32B after travelling from the fourth shuttle valve 44 through a fourth operation oil passage 75d. As a result, the output shafts 51a of the first travelling part 21L and the second travelling part 21R reversely rotate (rotate backwardly) at a speed that is proportional to an amount of tilt of the travelling lever 40, and thus the track loader 1 travels straight in the backward direction.

In a case where the travelling lever 40 is tilted rightward (in a direction indicated by arrow A3 in FIG. 1), the remote control valve for rightward turn 38 is operated, and pilot pressure is output from the remote control valve 38. This pilot pressure acts on the pressure receiving part for forward travelling 50a of the first driving circuit 32A after travelling from the first shuttle valve 41 through the first operation oil passage 75a and acts on the pressure receiving part for backward travelling 50b of the second driving circuit 32B after travelling from the fourth shuttle valve 44 through the fourth operation oil passage 75d. As a result, the output shaft 51a of the first travelling part 21L normally rotates and the output shaft 51a of the second travelling part 21R reversely rotates, and thus the track loader turns rightward.

In a case where the travelling lever 40 is tilted leftward (in a direction indicated by arrow A4 in FIG. 1), the remote control valve for leftward turn 39 is operated, and pilot pressure is output from the remote control valve 39. This pilot pressure acts on the pressure receiving part for forward travelling 50a of the second driving circuit 32B after travelling from the second shuttle valve 42 through the second operation oil passage 75b and acts on the pressure receiving part for backward travelling 50b of the first driving circuit 32A after travelling from the third shuttle valve 43 through the third operation oil passage 75c. As a result, the output shaft 51a of the second travelling part 21R normally rotates and the output shaft 51a of the first travelling part 21L reversely rotates, and thus the track loader turns leftward.

In a case where the travelling lever 40 is tilted in an oblique direction, directions and speeds of rotation of the output shafts 51a of the first travelling part 21L and the second travelling part 21R are determined by differential pressure between pilot pressure that acts on the pressure receiving part for forward travelling 50a and pilot pressure that acts on the pressure receiving part for backward travelling 50b of each of the first and second driving circuits 32A and 32B, and thus the track loader 1 turns rightward or leftward while travelling in the forward or backward direction.

Specifically, in a case where the travelling lever 40 is tilted in a diagonally forward leftward direction, the track loader 1 turns leftward while travelling in the forward direction at a speed corresponding to an angle of tilt of the travelling lever 40. In a case where the travelling lever 40 is tilted in a diagonally forward rightward direction, the track loader 1 turns rightward while travelling in the forward direction at a speed corresponding to an angle of tilt of the travelling lever 40. In a case where the travelling lever 40 is tilted in a diagonally backward leftward direction, the track loader 1 turns leftward while travelling in the backward direction at a speed corresponding to an angle of tilt of the travelling lever 40. In a case where the travelling lever 40 is tilted in a diagonally backward rightward direction, the track loader 1 turns rightward while travelling in the backward direction at a speed corresponding to an angle of tilt of the travelling lever 40.

A circuit (structure) around the first travelling part 21L is described below. Note that a circuit (structure) of the second travelling part 21R is similar to that of the first travelling part 21L.

The travelling motor (first hydraulic device) 51 of the first travelling part 21L includes a swash plate switching cylinder 53. The swash plate of the travelling motor 51 is linked to the swash plate switching cylinder 53. The speed of the travelling motor 51 is changed by supplying hydraulic oil to the swash plate switching cylinder 53, which is realized by a hydraulic cylinder or the like. That is, the angle of the swash plate of the travelling motor 51 is changed by stretching or contracting the swash plate switching cylinder 53. In this way, the travelling motor 51 is shifted to the first speed or the second speed.

A first oil passage (discharge oil passage) 71 is connected to the travelling motor 51, i.e., the swash plate switching cylinder 53. The first hydraulic pump P1 is connected to the first oil passage 71. Accordingly, hydraulic oil discharged from the first hydraulic pump P1 can be supplied to the travelling motor 51 (the swash plate switching cylinder 53). The reference signs X1, X2, and X3 in FIG. 1 indicates where the oil passage is connected.

Specifically, the first oil passage 71 includes a first supply passage 71a, a second supply passage 71b, a third supply passage 71c, and a fourth supply passage 71d. The first driving circuit 32A and the second driving circuit 32B are connected to the first supply passage 71a, so that pilot oil that is discharged from the first hydraulic pump P1 can be supplied to the first driving circuit 32A and the second driving circuit 32B. The travelling operation device 14 is connected to the second supply passage 71b, and the pilot oil of the first hydraulic pump P1 is supplied to the travelling operation device 14 through the second supply passage 71b. A first actuating part 61 and a second actuating part 62 are connected to the third supply passage 71c. The pilot oil of the first hydraulic pump P1 is supplied to the first actuating part 61 and the second actuating part 62. The fourth supply passage 71d connects the first hydraulic pump P1 and the swash plate switching cylinder 53.

A second oil passage 72 is connected to the first oil passage 71. The second oil passage 72 is connected to an intermediate part of the fourth supply passage 71d. In the fourth supply passage 71d, a restrictor (restricting part) 80 that reduces the amount of hydraulic oil is provided on an upstream side of a connection part where the fourth supply passage 71d and the second oil passage 72 are connected. The second oil passage 72 is an oil passage that can discharge the hydraulic oil in the first oil passage 71. The hydraulic oil tank 31 is connected to the second oil passage 72. A pilot check valve 65 is provided at an intermediate part of the second oil passage 72. The pilot check valve 65 has a pressure receiving part (a pilot port) 65a that receives the pressure of the hydraulic oil. In a case where the pressure of the hydraulic oil applied to the pressure receiving part 65a is equal to or higher than a predetermined value (a second pressure threshold), the pilot check valve 65 closes. That is, the pilot check valve 65 blocks discharge of the hydraulic oil in the second oil passage 72 when the pressure receiving part 65a receives the pressure of the hydraulic oil. Meanwhile, in a case where the pressure of the hydraulic oil applied to the pressure receiving part 65a is less than the predetermined value, the pilot check valve 65 can be opened. That is, the pilot check valve 65 allows discharge of the hydraulic oil in the second oil passage 72 when the pressure receiving part 65a does not receive the pressure of the hydraulic oil.

When discharge of the hydraulic oil from the second oil passage 72 is blocked by the pilot check valve 65, the pressure in the first oil passage 71 (fourth supply passage 71d) rises. This makes it possible to stretch the swash plate switching cylinder 53 from the first speed to the second speed. That is, the travelling motor (first hydraulic device) 51 can be shifted from the first speed to the second speed by blocking discharge of the hydraulic oil from the second oil passage 72 by using the pilot check valve 65. Since the swash plate switching cylinder 53 is stretched or contracted (speed is changed) by using the pilot check valve 65, it is possible to suppress shock at the time of speed change (at the time of gear shift). It is possible to suppress shock in a case where an operation mode of the travelling motor (first hydraulic device) 51 is changed. Furthermore, it is possible to improve operability at the time of speed change of the travelling motor 51.

The first actuating part 61 causes the hydraulic oil to act on the pressure receiving part 65a of the pilot check valve 65. The pressure receiving part 65a of the pilot check valve 65 and the first actuating part 61 are connected by a third oil passage 73.

The first actuating part 61 is a two-position switch-over valve whose position can be switched between a first position 61a and a second position 61b. The first actuating part 61 is switched, for example, by a control device 64. An operating member 66 is connected to the control device 64. The operating member 66 is realized by a see-saw type switch that is swingable, a slide-type switch that is slidable, a push-type switch that is capable of being pressed, or a lever.

In a case where a command to shift to the first speed is given by the operating member 66, the control device 64 demagnetizes a solenoid of the first actuating part (two-position switch-over valve) 61. In a state where the solenoid of the first actuating part 61 is demagnetized, the first actuating part is at the first position 61a, and therefore the pressure of the hydraulic oil (pilot oil) does not act on the pressure receiving part 65a of the pilot check valve 65. In a case where a command to shift to the second speed is given by the operating member 66, the control device 64 excites the solenoid of the first actuating part (two-position switch-over valve) 61. In a state where the solenoid of the first actuating part 61 is excited, the first actuating part 61 is at the second position 61b, and therefore the pressure of the hydraulic oil (pilot oil) acts on the pressure receiving part 65a of the pilot check valve 65.

The hydraulic system has, separately from the travelling motor (first hydraulic device) 51, a second hydraulic device whose operation mode can be changed in a case where the pressure of hydraulic oil becomes equal to or higher than a predetermined value (a third pressure threshold). In the present embodiment, the second hydraulic device is a braking mechanism 52 for braking the travelling motor 51.

The braking mechanism 52 is switched between a state where the braking mechanism 52 brakes the travelling motor 51 and a state where the braking mechanism 52 releases braking by the pilot oil (hydraulic oil) discharged from the first hydraulic pump P1. For example, the braking mechanism 52 has a first disc provided on the output shaft 51a of the travelling motor 51, a second disc that is movable, and a spring that energizes the second disc toward a side on which the second disc contacts the first disc. Furthermore, the braking mechanism 52 includes a containing part (containing case) 52a in which the first disc, the second disc, and the spring are contained. A fourth oil passage 74 is connected to a part of the containing part 52a in which the second disc is stored. That is, the braking mechanism 52 is connected. A restrictor (restricting part) 81 is provided at an intermediate part of the fourth oil passage 74. The second actuating part 62 is connected to an upstream side of the restricting part 81 of the fourth oil passage 74.

The second actuating part 62 causes the braking mechanism 52 to perform a braking action or a braking releasing action. The second actuating part 62 is a two-position switch-over valve whose position can be switched between a first position 62a and a second position 62b. The second actuating part 62 is switched, for example, by the control device 64.

The control device 64 causes the second actuating part 62 to be at the first position 62a by demagnetizing a solenoid of the second actuating part (two-position switch-over valve) 62. In a case where the second actuating part 62 is at the first position 62a, the hydraulic oil in the fourth oil passage 74 flows to the hydraulic oil tank 31. This causes the pressure of the pilot oil to be equal to or lower than a predetermined value in the storage part of the containing part 52a. Accordingly, the second disc moves toward the side on which the second disc contacts the first disc. The travelling motor 51 is braked by the braking mechanism 52. The control device 64 causes the second actuating part 62 to be at the second position 62b by exciting the solenoid of the second actuating part (two-position switch-over valve) 62. In a case where the second actuating part 62 is at the second position 62b, hydraulic oil discharged from the first hydraulic pump P1 flows to the fourth oil passage 74. This causes the pressure in the storage part of the containing part 52a to reach a predetermined value, thereby causing the second disc to move to a side opposite to the case of braking (side opposite to the side toward which the second disc is energized by the spring). Braking of the travelling motor 51 is released by the braking mechanism 52.

In the present embodiment, the third oil passage 73 and the fourth oil passage 74 are connected to each other. The third oil passage 73 includes a first flow passage 73a, a second flow passage 73b, and a third flow passage 73c. The first flow passage 73a is an oil passage that is connected to the fourth oil passage 74 so as to be able to discharge the hydraulic oil in the fourth oil passage 74. A restrictor (restricting part) 82 is provided at an intermediate part of the first flow passage 73a, and the hydraulic oil tank 31 is connected to the first flow passage 73a.

The second flow passage 73b is a flow passage that connects the first flow passage 73a and the first actuating part 61. One end of the second flow passage 73b is connected to a section of the first flow passage 73a that is located between the restricting part 82 of the first flow passage 73a and the hydraulic oil tank 31. A restrictor (restricting part) 83 is provided at an intermediate part of the second flow passage 73b, and a non-return valve (check valve) 84 is provided on an upstream side (first actuating part 61 side) of the restricting part 83. The check valve 84 allows passage of hydraulic oil that flows from the first actuating part 61 to the downstream and blocks passage of hydraulic oil that flows from the downstream to the first actuating part 61.

The third flow passage 73c is a flow passage that connects the second flow passage 73b and the pressure receiving part 65a. One end of the third flow passage 73c is connected to a section of the second flow passage 73b that is located between the restricting part 83 and the check valve 84.

According to the above arrangement, hydraulic oil (pilot oil) can be supplied to the pressure receiving part 65a through the first flow passage 73a and the third flow passage 73c in a state where braking of the travelling motor 51 is released by the braking mechanism 52. In a case where the first actuating part 61 is switched to the second position 61b in the state where braking of the travelling motor 51 is released, the travelling motor 51 can be shifted from the first speed to the second speed.

Figure 2:
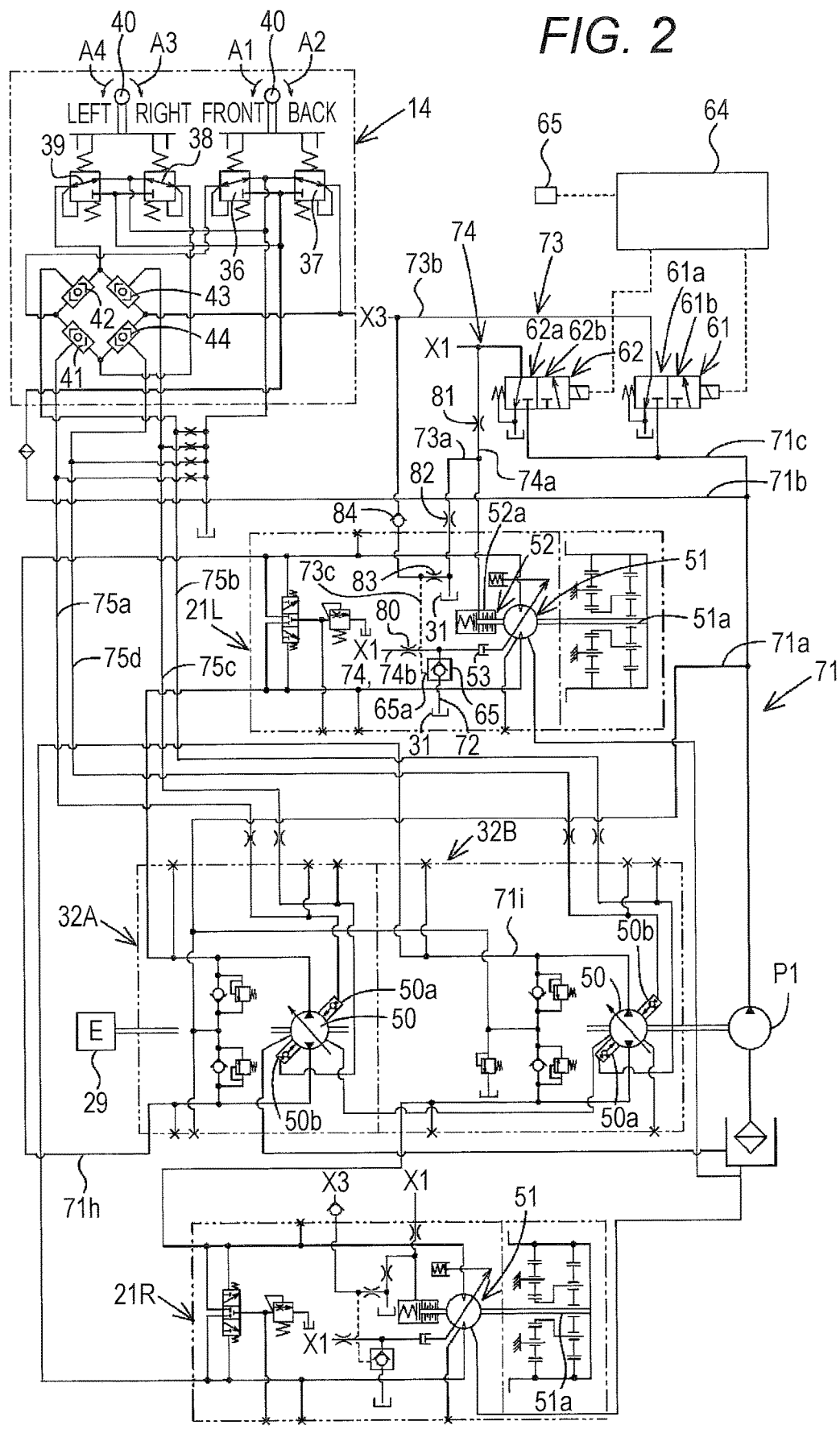
FIG. 2 is a diagram illustrating a modification of the hydraulic system (hydraulic circuit) according to the first embodiment.

In the embodiment described above, the first oil passage 71 is connected to the travelling motor (first hydraulic device) 51. Instead, the fourth oil passage 74 may be connected to the travelling motor (first hydraulic device) 51 as illustrated in FIG. 2. Specifically, the fourth oil passage 74 has a first flow passage 74a that connects the second actuating part 62 and the braking mechanism (second hydraulic device) 52 and a second flow passage 74b that connects the second actuating part 62 and the travelling motor (first hydraulic device) 51. In the second flow passage 74b, the restricting part 80, the second oil passage 72, and the swash plate switching cylinder 53 are provided. Therefore, hydraulic oil can be supplied to the travelling motor (first hydraulic device) 51 in a state where braking is released by the braking mechanism 52 by switching the second actuating part 62 to the second position 62b. That is, in the hydraulic system of FIG. 2, the speed of the travelling motor 51 can be changed in a case where braking is released and travelling is possible.

Second Embodiment

Figure 3:
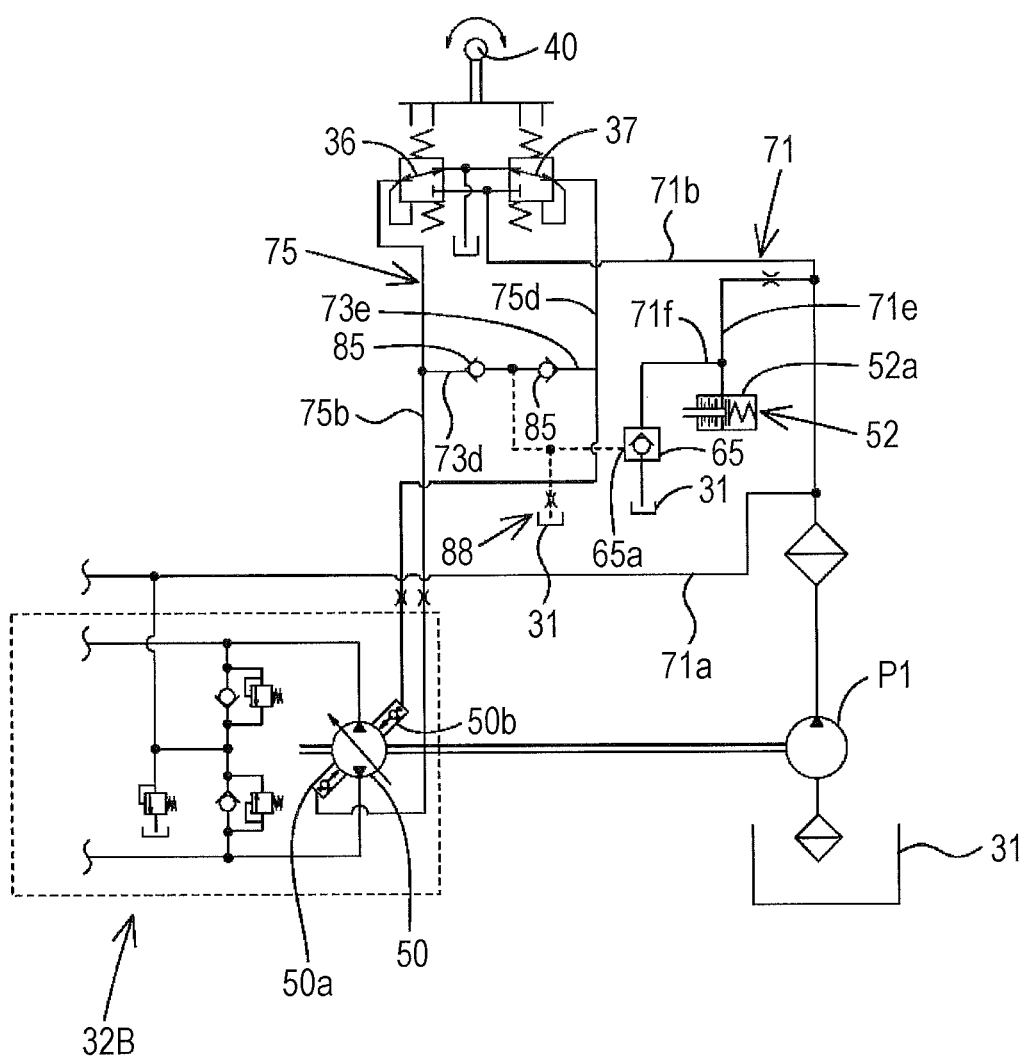
FIG. 3 is a diagram illustrating a hydraulic system (hydraulic circuit) according to a second embodiment.

A second embodiment is a modification of the hydraulic system. FIG. 3 illustrates modified parts of the hydraulic system of the second embodiment as comparable to the first embodiment. Other parts of the second embodiment that are not shown in FIG. 3 are similar to those in the first embodiment. In the description of second embodiment set forth below, structures that are different from that of the first embodiment are described.

As illustrated in FIG. 3, a first hydraulic device is a braking mechanism 52 for braking the travelling motor, and a second hydraulic device is a travelling pump 50. A first oil passage 71 includes a first supply passage 71a, a second supply passage 71b, a fifth supply passage 71e, and a sixth supply passage 71f. The fifth supply passage 71e connects a first hydraulic pump P1 and a containing part (containing case) 52a of the braking mechanism 52. The sixth supply passage 71f is connected to the fifth supply passage 71e. The sixth supply passage 71f is an oil passage through which hydraulic oil in the fifth supply passage 71e can be discharged. A hydraulic oil tank 31 is connected to the sixth supply passage 71f.

A pilot check valve 65 having a pressure receiving part 65a is provided at an intermediate part of the sixth supply passage 71f.

A first actuating part is remote control valves (remote control valves 36, 37, 38, and 39) that change the pressure of hydraulic oil in accordance with an operation of a travelling lever 40. For convenience of description, the following description takes the remote control valve 36 and the remote control valve 37 as an example. Note that the remote control valves are not limited to the ones illustrated in the embodiment. The first actuating part (remote control valves) and the travelling pump (second hydraulic device) 50 are connected to each other by a fifth oil passage 75. The fifth oil passage 75 includes a second operation oil passage 75b that connects the remote control valve 36 and a pressure receiving part for forward travelling 50a of the travelling pump 50 and a fourth operation oil passage 75d that connects the remote control valve 37 and a pressure receiving part for backward travelling 50b of the travelling pump 50.

The fifth oil passage 75 and a third oil passage 73 are connected to each other. The third oil passage 73 has a fourth flow passage 73d that is connected to the second operation oil passage 75b and a fifth flow passage 73e that is connected to the fourth operation oil passage 75d. A check valve 85 is connected to an intermediate part of each of the fourth flow passage 73d and the fifth flow passage 73e. The fourth flow passage 73d and the fifth flow passage 73e merge with each other, and a merged side thereof is connected to the pressure receiving part 65. Note that a high-pressure selection valve that selects a higher pressure may be used instead of the check valve 85. A bleed-off circuit (bleed-off oil passage) 88, i.e., a sixth oil passage 88 through which hydraulic oil is discharged is provided in an oil passage into which the fourth flow passage 73d and the fifth flow passage 73e merge.

According to the above configuration, when the first actuating part (remote control valve) is operated, the travelling pump (second hydraulic device) 50 works in accordance with pressure that is output from the remote control valve. In this case, the pressure of hydraulic oil not only in the fifth oil passage 75, but also in the third oil passage 73 (the fourth flow passage 73d and the fifth flow passage 73e) rises. When the pressure of the hydraulic oil in the third oil passage 73 rises, the pilot check valve 65 closes (blocks flow of the hydraulic oil in the sixth supply passage 71f to the hydraulic oil tank 31). As a result, the pressure of the sixth supply passage 71f increases, and the braking mechanism 52 releases braking. That is, according to the second embodiment, it is possible to automatically release braking in a case where a travelling operation is performed by using the travelling lever 40.

When an operation of the first actuating part (remote control valve) is stopped, the hydraulic oil in the third oil passage 73 (the fourth flow passage 73d and the fifth flow passage 73e) is discharged to the hydraulic oil tank 31 through the bleed-off circuit (bleed-off oil passage) 88, and the pressure in the third oil passage 73 drops accordingly. The braking mechanism 52 performs a braking action. That is, it is possible to automatically perform a braking action in a case where the travelling operation of the travelling lever 40 is stopped.

Although the first actuating part that is capable of changing the amount of flow of hydraulic oil to the third oil passage is the remote control valves (remote control valves 36, 37, 38, and 39), the remote control valves need not be directly connected to a travelling member (travelling lever 40). Furthermore, the hydraulic system may have a structure such that a swash plate of the travelling pump 50 is operated directly by the pressure of hydraulic oil discharged from the remote control valves.

Although the first hydraulic device is the braking mechanism 52 and the second hydraulic device is the travelling pump 50 in the above description, the first hydraulic device and the second hydraulic device are not limited to the braking mechanism 52 and the travelling pump 50. That is, the second hydraulic device can be any hydraulic device that works in accordance with the pressure of hydraulic oil that is output from a remote control valve. This allows the first hydraulic device to work in a case where the operating member (remote control valve) that causes the second hydraulic device to work is operated. That is, the first hydraulic device and the second hydraulic device can be caused to work in conjunction with an operation of the operating member.

Third Embodiment

Figure 4:
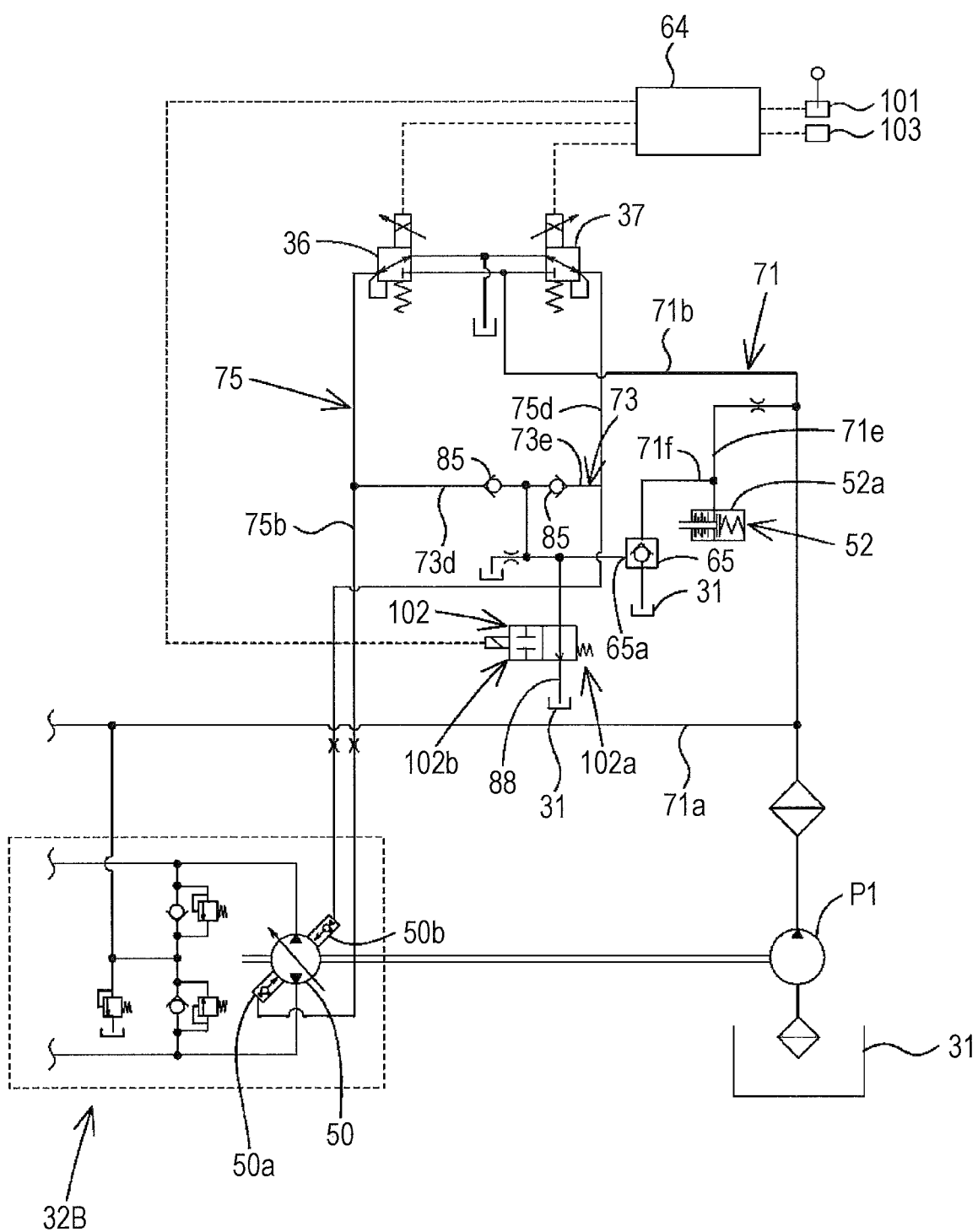
FIG. 4 is a diagram illustrating a hydraulic system (hydraulic circuit) according to a third embodiment.

A third embodiment is a modification of the hydraulic system. FIG. 4 illustrates modified parts of the hydraulic system of the third embodiment as comparable to the second embodiment. Other parts of the third embodiment that are not shown in FIG. 4 are similar to those in the first embodiment or the second embodiment.

As illustrated in FIG. 4, a first hydraulic device is a braking mechanism 52, and a second hydraulic device is a travelling pump 50. Remote control valves (remote control valves 36 and 37) are electromagnetic proportional valves whose degrees of opening are changed on the basis of a control signal that is output from a control device 64. That is, in the second embodiment, an operation of the travelling lever 40 directly acts on the remote control valves, and thus the remote control valves change the pressure of hydraulic oil. Meanwhile, the remote control valves in the third embodiment are valves that electrically act. For convenience of description, FIG. 4 illustrates the remote control valves 36 and 37. However, the following description can also be applied to other remote control valves 38 and 39 and hydraulic devices and the like that correspond to the remote control valves 38 and 39.

An operating member 101 is connected to the control device 64. The operating member 101 is a travelling lever that is swingable. In a case where the travelling lever 101 is operated, the amount of operation and/or a direction of swing are input to the control device 64. The control device 64 supplies a control signal corresponding to the amount of swing that is output from the travelling lever 101 to a remote control valve. The degree of opening of the remote control valve changes in accordance with the control signal supplied from the control device 64. Therefore, the travelling pump 50 can be normally rotated or reversely rotated as in the above embodiments by operating the travelling pump 101.

As illustrated in FIG. 4, a first switching valve 102 is connected to a bleed-off circuit (sixth oil passage) 88. The switching valve 102 is a two-position switch-over valve whose position can be switched between a first position 102a and a second position 102b and is a hydraulic lock valve for hydraulic locking. The hydraulic lock valve 102 is switched, for example, by the control device 64. A switch 103 is connected to the control device 64. In a case where the switch 103 is on, the control device 64 demagnetizes a solenoid of the hydraulic lock valve 102. The hydraulic lock valve 102 is at the first position 102a in the state where the solenoid thereof is demagnetized. Accordingly, hydraulic oil in the third oil passage 73 (a fourth flow passage 73d and a fifth flow passage 73e) is discharged to a hydraulic oil tank 31 through the sixth oil passage 88. As a result, the pressure in the third oil passage 73 drops, and the braking mechanism 52 performs a braking action. That is, a braking action can be performed in conjunction with hydraulic locking by turning the switch 103 for hydraulic locking on.

In a case where the switch 103 is off, the control device 64 excites the solenoid of the hydraulic lock valve 102. The hydraulic lock valve 102 is at the second position 102b in the state where the solenoid thereof is excited. Accordingly, the hydraulic oil in the third oil passage 73 does not flow through the sixth oil passage 88. As a result, the pressure in the third oil passage 73 rises, and the braking mechanism 52 releases braking. That is, braking can be released in conjunction with hydraulic locking by turning the switch 103 off.

Fourth Embodiment

Figure 5:
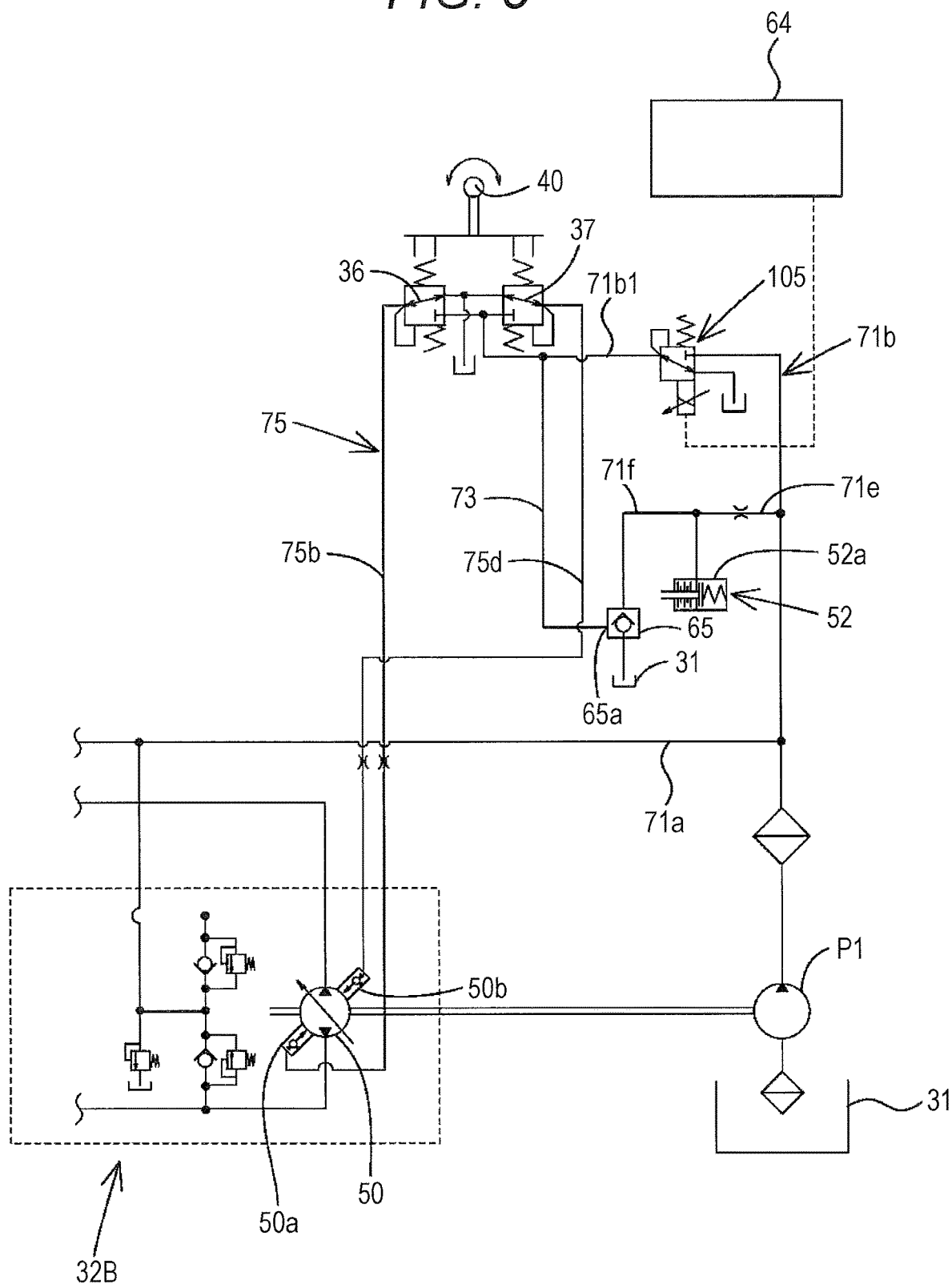
FIG. 5 is a diagram illustrating a hydraulic system (hydraulic circuit) according to a fourth embodiment.

A fourth embodiment is a modification of the hydraulic system. FIG. 5 illustrates modified parts of the hydraulic system of the fourth embodiment as comparable to the second embodiment. Other parts of the fourth embodiment that are not shown in FIG. 5 are similar to those in the first embodiment or the second embodiment.

As illustrated in FIG. 5, a first hydraulic device is a braking mechanism 52, and a second hydraulic device is a travelling pump 50. A first actuating part is an electromagnetic proportional valve 105 that is provided on an upstream side of remote control valves (remote control valves 36 and 37). For convenience of description, the remote control valves 36 and 37 are illustrated in the fourth embodiment, as illustrated in FIG. 5. However, the following description can also be applied to other remote control valves 38 and 39 and hydraulic devices and the like that correspond to the remote control valves 38 and 39.

The electromagnetic proportional valve 105 is, for example, a control valve (anti-stall control valve) that prevents engine stall. The degree of opening of the electromagnetic proportional valve 105 is changed by a control device 64. Anti-stall control performed by the control device 64 and the electromagnetic proportional valve 105 is described below.

The control device 64 prevents engine stall by changing the degree of opening of the electromagnetic proportional valve 105 on the basis of a drop amount of an engine, which is a difference between target rotational speed of the engine and actual rotational speed of the engine. Note that the control device 64 is capable of acquiring the actual rotational speed of the engine and the target rotational speed of the engine.

Figure 6:
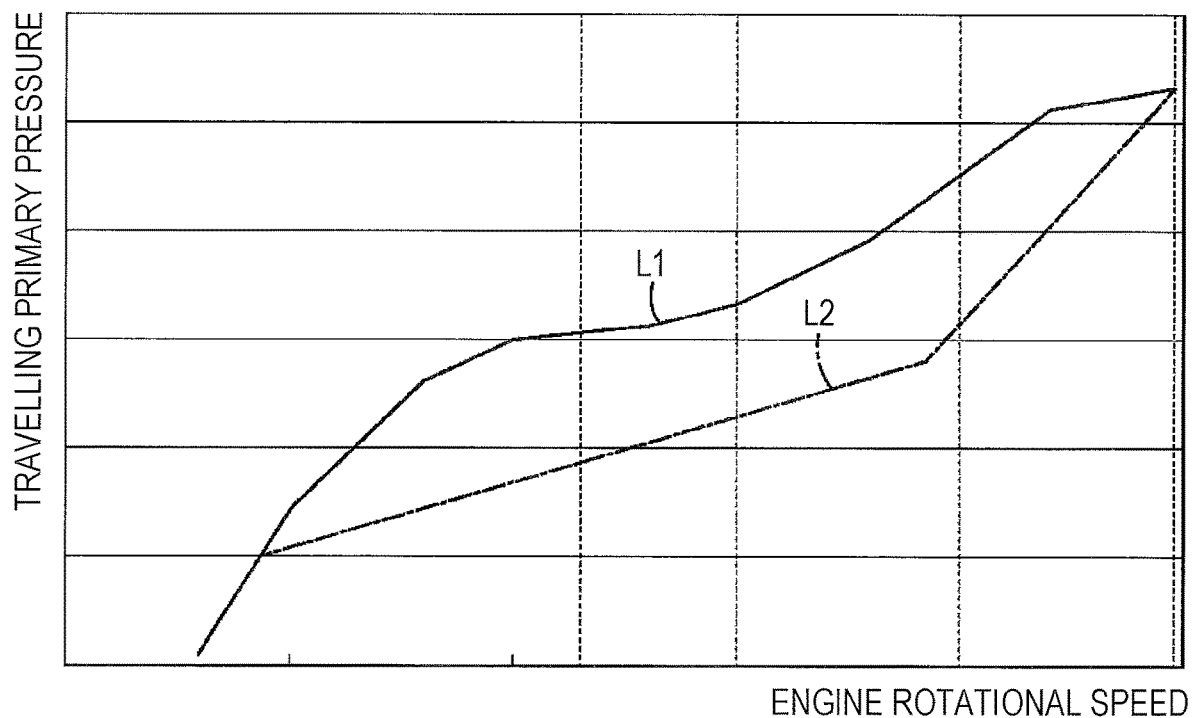
FIG. 6 is a diagram for explaining anti-stall and illustrates a relationship between primary pressure and engine rotational speed.

FIG. 6 illustrates a relationship among engine rotational speed, travelling primary pressure, and controls lines L1 and L2.

The travelling primary pressure is pressure (pilot pressure) of hydraulic oil in a second supply passage 71b from the electromagnetic proportional valve 105 to the remote control valves. That is, the travelling primary pressure is primary pressure of hydraulic oil that enters the remote control valves provided in the travelling lever 40 for a travelling operation. The control line L1 indicates a relationship between the engine rotational speed and the travelling primary pressure in a case where the drop amount is less than a predetermined value. The control line L2 indicates a relationship between the engine rotational speed and the travelling primary pressure in a case where the drop amount is equal to or larger than the predetermined value.

In a case where the drop amount is less than the predetermined value, the control device 64 adjusts the degree of opening of the electromagnetic proportional valve 105 so that the relationship between the actual rotational speed of the engine and the travelling primary pressure coincides with the control line L1. In a case where the drop amount is equal to or larger than the predetermined value, the control device 64 adjusts the degree of opening of the electromagnetic proportional valve 105 so that the relationship between the actual rotational speed of the engine and the travelling primary pressure coincides with the control line L2. On the control line L2, the travelling primary pressure with respect to predetermined engine rotational speed is lower than that on the control line L1. That is, the travelling primary pressure of the control line L2 is lower than that of the control line L1 with respect to the same engine rotational speed. Accordingly, the pressure (pilot pressure) of the hydraulic oil that enters the remote control valves is kept low by control based on the control line L2. As a result, a swash plate of an HST pump 50 is adjusted, and load that acts on an engine 29 decreases. It is therefore possible to prevent stall of the engine 29. Note that although a single control line L2 is illustrated in FIG. 6, the number of control lines L2 may be more than one. For example, the control line L2 may be set for each engine rotational speed.

It is preferable that the control device 64 has data indicative of the control line L1 and the control line L2, control parameters of a function or the like.

A third oil passage 73 is connected to a section 71b1 of the second supply passage 71b that is located between the electromagnetic proportional valve 105 and the remote control valves. With the arrangement, since the pressure in the third oil passage 73 rises while the electromagnetic proportional valve 105 is in operation, braking can be released in conjunction with anti-stall control. Note that although an anti-stall control valve is used as an example of the electromagnetic proportional valve 105 in the present embodiment, the electromagnetic proportional valve 105 need not be an anti-stall control valve.

Fifth Embodiment

Figure 7:
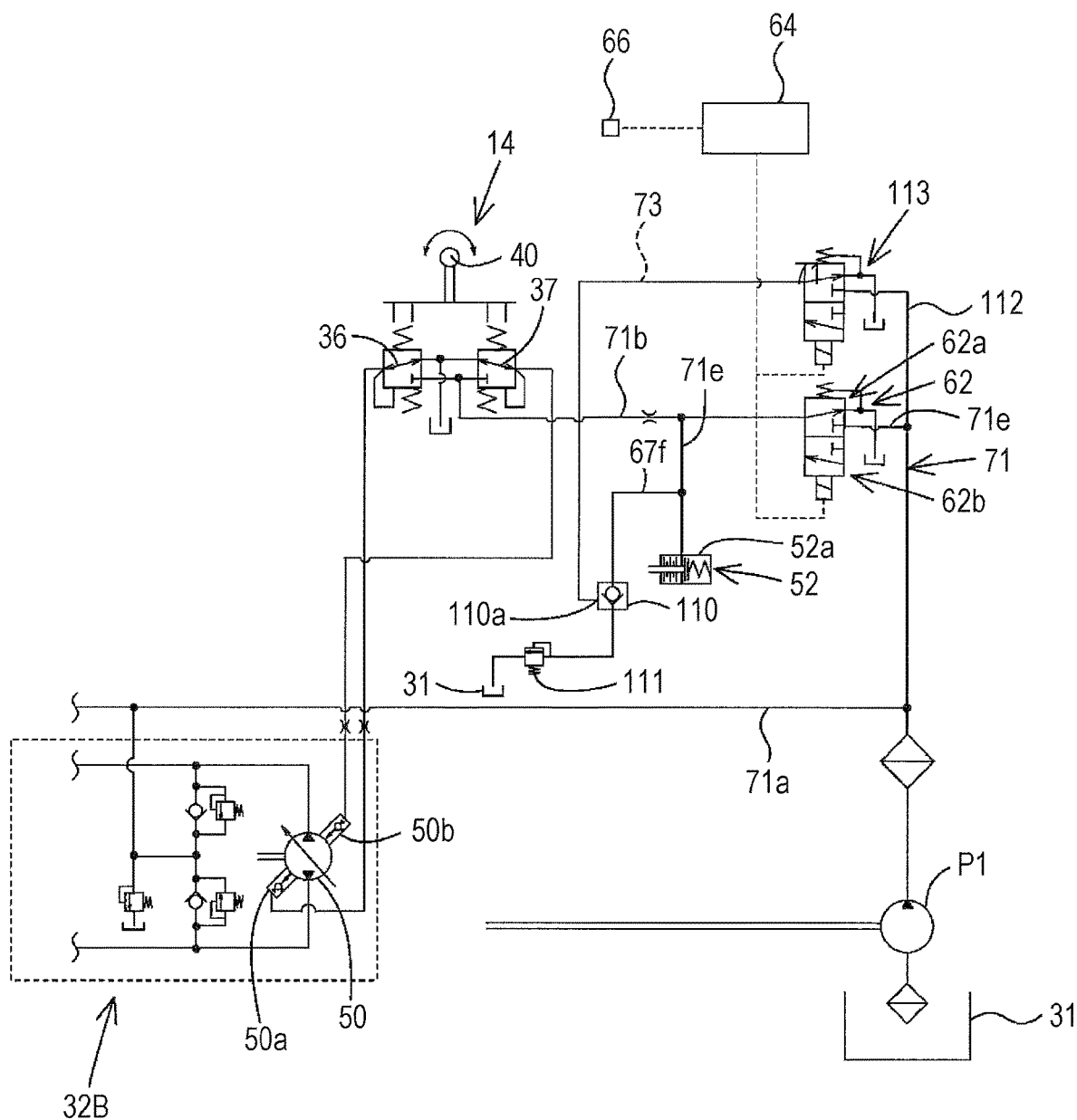
FIG. 7 is a diagram illustrating a hydraulic system (hydraulic circuit) according to a fifth embodiment.

A fifth embodiment is an embodiment in which a pilot check valve 110 is used instead of the pilot check valve 65, as illustrated in FIG. 7.

The pilot check valve 110 has a pressure receiving part (a pilot port) 110a that receives the pressure of hydraulic oil. In a case where the pressure of the hydraulic oil applied to the pressure receiving part 110a is equal to or higher than a predetermined value (a fourth pressure threshold), the pilot check valve 110 opens. That is, the pilot check valve 110 allows discharge of the hydraulic oil in a second oil passage when the pressure receiving part 110a receives the pressure of the hydraulic oil. Meanwhile, in a case where the pressure of the hydraulic oil applied to the pressure receiving part 110a is less than the predetermined value (the fourth pressure threshold), the pilot check valve 110 closes. That is, the pilot check valve 110 blocks discharge of the hydraulic oil in the second oil passage when the pressure receiving part 110a does not receive the pressure of the hydraulic oil. In the present embodiment, the sixth supply passage 71f described in the first embodiment is the second oil passage.

The pilot check valve 110 is provided at an intermediate part of the second oil passage (sixth supply passage 71f), as illustrated in FIG. 7. A relief valve 111 is provided on a downstream side of the pilot check valve 110. A first hydraulic device is a braking mechanism 52. A first oil passage 71 has a fifth supply passage 71e that connects a first hydraulic pump P1 and a containing part (containing case) 52a of the braking mechanism 52 and a second supply passage 71b connected to the fifth supply passage 71e. A braking valve 62 for braking or release of braking of the braking mechanism 52 is provided at an intermediate part of the fifth supply passage 71e. Note that the braking valve 62 is similar to the second actuating part of the first embodiment.

On an upstream side of the braking valve 62, the fifth supply passage 71e is branched, and a switching valve (second switching valve) 113 is connected to a branched oil passage 112. A third oil passage 73 that is connected to the pilot check valve 110 is connected to the switching valve 113. The switching valve 113 is a two-position switch-over valve whose position can be switched between a first position and a second position.

The switching valve 113 can be switched by a control device 64 or the like. For example, a switch or the like is connected to the control device 64, and in a case where the switch is turned on, the control device 64 excites a solenoid of the switching valve 113 so that the switching valve 113 is switched to the second position. In a case where the switch is turned off, the control device 64 demagnetizes the solenoid of the switching valve 113 so that the switching valve 113 is switched to the first position. Therefore, the pressure of hydraulic oil that acts on the pilot check valve 110 (a flow amount of hydraulic oil flowing through the third oil passage 73) can be changed by operating the switch connected to the control device 64. As a result, primary pressure of hydraulic oil that acts on remote control valves (remote control valve 36, 37) of a travelling operation device 14 can be changed. For convenience of description, the remote control valves 36 and 37 are illustrated in the fifth embodiment, as illustrated in FIG. 7. However, the above description can also be applied to other remote control valves 38 and 39 and hydraulic devices and the like that correspond to the remote control valves 38 and 39.

Sixth Embodiment

Figure 8:
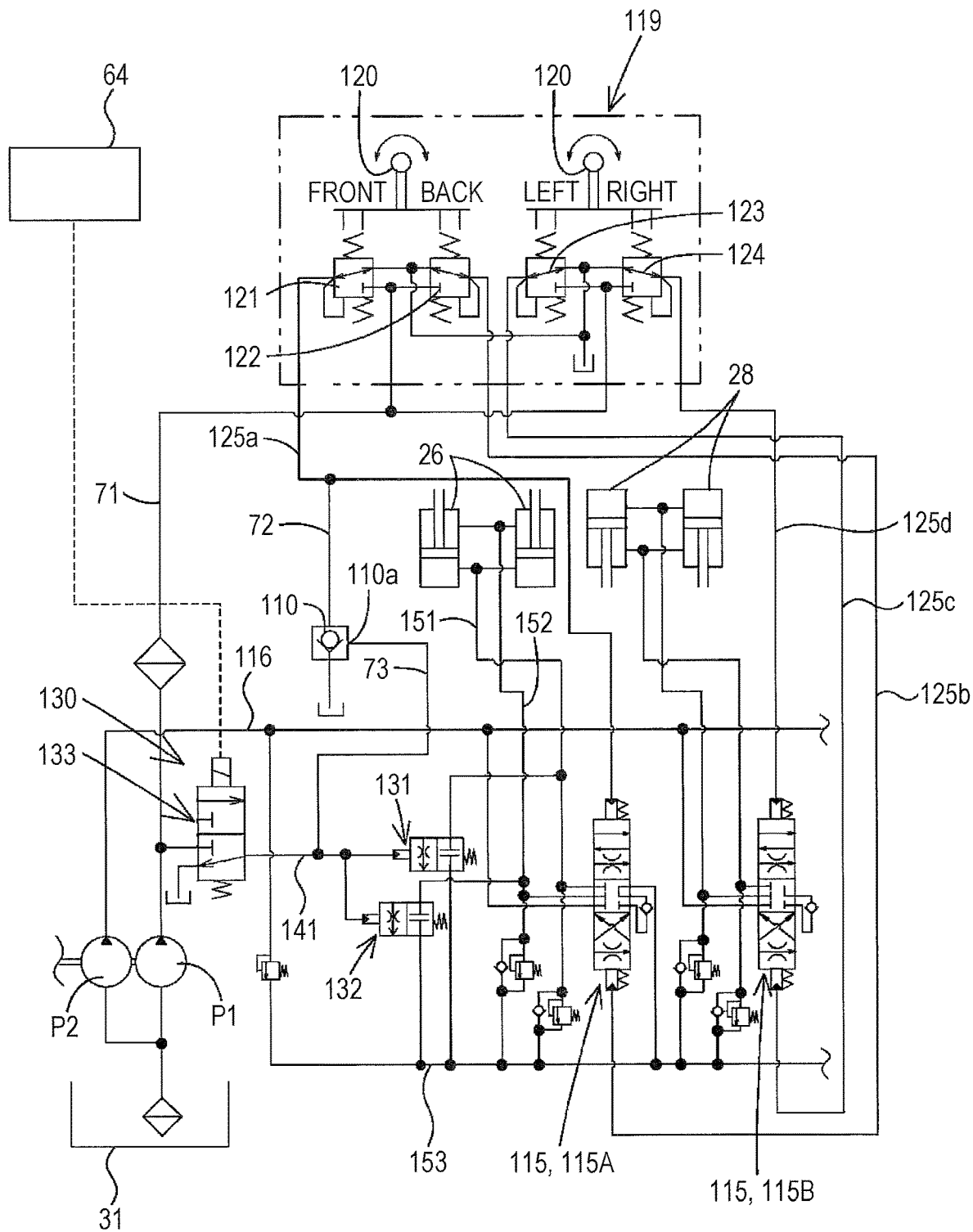
FIG. 8 is a diagram illustrating a hydraulic system (hydraulic circuit) according to a sixth embodiment.

A sixth embodiment is a modification of the hydraulic system. FIG. 8 illustrates a case where a pilot check valve 110 is applied to a hydraulic system of a work system. First, the hydraulic system of the work system is described. Note that the hydraulic system of the work system is not limited to a configuration described below.

As illustrated in FIG. 8, the hydraulic system of the work system is a system for actuating a boom 22L, a boom 22R, a bucket 23 (working tool), and the like and includes a plurality of operation control valves 115 and a hydraulic pump (second hydraulic pump) P2 of the work system.

The second hydraulic pump P2 is a pump that is provided at a different position from the first hydraulic pump P1 and is realized by a fixed displacement gear pump. The second hydraulic pump P2 can discharge hydraulic oil stored in a hydraulic oil tank 22. In particular, the second hydraulic pump P2 mainly discharges hydraulic oil for actuating a hydraulic actuator.

A main oil passage (oil passage) 116 is provided on a discharge side of the second hydraulic pump P2. The plurality of operation control valves 115 are connected to the main oil passage 116. The operation control valves 115 are valves that can change a direction of flow of hydraulic oil by pilot pressure of pilot oil.

The plurality of operation control valves 115 include a first operation control valve 115A and a second operation control valve 115B. The first operation control valve 115A is a valve that controls a lift cylinder 26. The second operation control valve 115B is a valve that controls a tilt cylinder 28.

The first operation control valve 115A and the second operation control valve 115B are pilot-type direct-acting spool type three-position switch-over valves. The first operation control valve 115A and the second operation control valve 115B are switched among a first position, a neutral position, and a second position by the pilot pressure.

The lift cylinder 26 is connected to the first operation control valve 115A via oil passages 151 and 152, and the tilt cylinder 28 is connected to the second operation control valve 115B via oil passages.

The boom 22L, the boom 22R, and the bucket 23 can be operated by a work operation device 119 that is provided around a driver's seat 13. The work operation device 119 includes an operating member 120 and a plurality of remote control valves 121, 122, 123, and 124. The operating member 120 is an operation lever that is supported so as to be tiltable from a neutral position in forward, backward, leftward, rightward, and oblique directions. By tilting the operation lever 120, the plurality of remote control valves 121, 122, 123, and 124 that are provided below the operation lever 120 can be operated. The remote control valves 121, 122, 123, and 124 and the first hydraulic pump P1 are connected to each other by a discharge oil passage 71.

The plurality of remote control valves 121, 122, 123, and 124 and the plurality of operation control valves 115 are connected to each other by a plurality of oil passages 125a, 125b, 125c, and 125d. Specifically, the remote control valve 121 is connected to the first operation control valve 115A via the first operation oil passage 125a. The remote control valve 122 is connected to the first operation control valve 115A via the second operation oil passage 125b. The remote control valve 123 is connected to the second operation control valve 115B via the third operation oil passage 125c. The remote control valve 124 is connected to the second operation control valve 115B via the fourth operation oil passage 125d. Each of the remote control valves 121, 122, 123, and 124 can set the pressure of output hydraulic oil in accordance with an operation of the operation lever 120.

Specifically, when the operation lever 120 is tilted forward, the remote control valve for downward movement 121 is operated, and pilot pressure of pilot oil that is output from the remote control valve for downward movement 121 is set. This pilot pressure acts on a pressure receiving part (a pilot port) of the first operation control valve 115A. As a result, the lift cylinder 26 contracts, and the booms 22L and 22R move downward.

When the operation lever 120 is tilted backward, the remote control valve for upward movement 122 is operated, and pilot pressure of pilot oil that is output from the remote control valve for upward movement 122 is set. This pilot pressure acts on the pressure receiving part of the first operation control valve 115A. As a result, the lift cylinder 26 stretches, and the booms 22L and 22R move upward.

When the operation lever 120 is tilted rightward, the remote control valve for bucket dumping 123 is operated, and pilot pressure of pilot oil that is output from the remote control valve 123 is set. This pilot pressure acts on a pressure receiving part (a pilot port) of the second operation control valve 115B. As a result, the tilt cylinder 28 stretches, and the bucket 23 performs a dumping action.

When the operation lever 120 is tilted leftward, the remote control valve for bucket scooping 124 is operated, and pilot pressure of pilot oil that is output from the remote control valve 124 is set. This pilot pressure acts on the pressure receiving part of the second operation control valve 115B. As a result, the tilt cylinder 28 contracts, and the bucket 23 performs a scooping action.

A float control device 130 that can bring the lift cylinder 26 into a float state is provided as illustrated in FIG. 8. The float control device 130 includes a first float control valve 131, a second float control valve 132, and a float switching valve 133.

Each of the first float control valve 131 and the second float control valve 132 is a two-position switch-over valve whose position can be switched between a first position where passage of hydraulic oil is blocked and a second position where passage of hydraulic oil is allowed. The first float control valve 131 and the second float control valve 132 are connected to the float switching valve 133 via an oil passage 141. The first float control valve 131 is connected to the oil passage (a first additional oil passage) 151 that connects a bottom side (a bottom chamber) of the lift cylinder 26 and the first operation control valve 115A. Furthermore, the first float control valve 131 is connected to an oil passage 153 that discharges hydraulic oil. In a case where the first float control valve 131 is at the second position, the oil passage 151 and the oil passage 153 are communicated with each other, whereas in a case where the first float control valve 131 is at the first position, communication between the oil passage 151 and the oil passage 153 is blocked.

The second float control valve 132 is connected to the oil passage (a second additional oil passage) 152 that connects a rod side (a rod chamber) of the lift cylinder 26 and the first operation control valve 115A. Furthermore, the second float control valve 132 is connected to the oil passage 153. In a case where the second float control valve 132 is at the second position, the oil passage 152 and the oil passage 153 are communicated with each other, whereas in a case where the second float control valve 132 is at the first position, communication between the oil passage 152 and the oil passage 153 is blocked.

Therefore, by placing the first float control valve 131 and the second float control valve 132 at the second position, the bottom side and the rod side of the lift cylinder 26 are communicated with the oil passage (discharge oil passage) 153, and therefore the lift cylinder 26 can be brought into a float state. By placing the first float control valve 131 and the second float control valve 132 at the first position, the lift cylinder 26 is brought into a state that is not the float state, and thus the lift cylinder 26 can be moved upward or downward by the first operation control valve 115A.

The first float control valve 131 and the second float control valve 132 can be switched by the float switching valve 133 and the control device 64. The float switching valve 133 is a two-position switch-over valve whose position can be switched between a first position and a second position. For example, a switch or the like is connected to the control device 64, and in a case where the switch is turned on, the control device 64 excites a solenoid of the float switching valve 133 so that the float switching valve 133 is switched to the second position. This causes the pressure of hydraulic oil discharged from the first hydraulic pump P1 to be output to the oil passage 141. In this way, the first float control valve 131 and the second float control valve 132 can be switched to the second position. Meanwhile, in a case where the switch is turned off, the control device 64 demagnetizes the solenoid of the float switching valve 133 so that the float switching valve 133 is switched to the first position, and thus hydraulic oil in the oil passage 141 is discharged to the hydraulic oil tank 31 or the like. In this way, the first float control valve 131 and the second float control valve 132 can be switched to the first position.

As illustrated in FIG. 8, a first actuating part that causes hydraulic oil to act on the pressure receiving part 110a of the pilot check valve 110 is the float switching valve 133. A first hydraulic device is the first operation control valve 115A for actuating the lift cylinder 26, and a first oil passage includes the discharge oil passage 71 and the first operation oil passage 125a.

A second oil passage 72 is connected to the first operation oil passage 125a that connects the remote control valve 121 and the first operation control valve 115A. That is, the second oil passage 72 is connected to the first operation oil passage (lowering operation oil passage) 125a for giving a command to perform an operation of lowering the lift cylinder 26 to the operation control valve 115A. The pilot check valve 110 is provided in this second oil passage 72. A third oil passage 73 that is connected to the pressure receiving part 110a of the pilot check valve 110 is connected to the oil passage 141.

Therefore, during the float operation, hydraulic oil acts on the pressure receiving part 110a of the pilot check valve 110. That is, in a case where an operation of lowering the booms 22L and 22R is performed during the float operation, it is possible to prevent the operation control valve 115A from working. It is therefore possible to eliminate wasteful use of hydraulic oil.

Note that the first hydraulic device may be the second operation control valve 115B that controls a hydraulic actuator such as the tilt cylinder 28 or may be a different operation control valve. The first oil passage is applicable not only to the first operation oil passage 125a, but also to any of the second operation oil passage 125b, the third operation oil passage 125c, and the fourth operation oil passage 125d. In this case, the second oil passage 72 is also applicable to any of the second operation oil passage 125b, the third operation oil passage 125c, and the fourth operation oil passage 125d.

Seventh Embodiment

Figure 9:
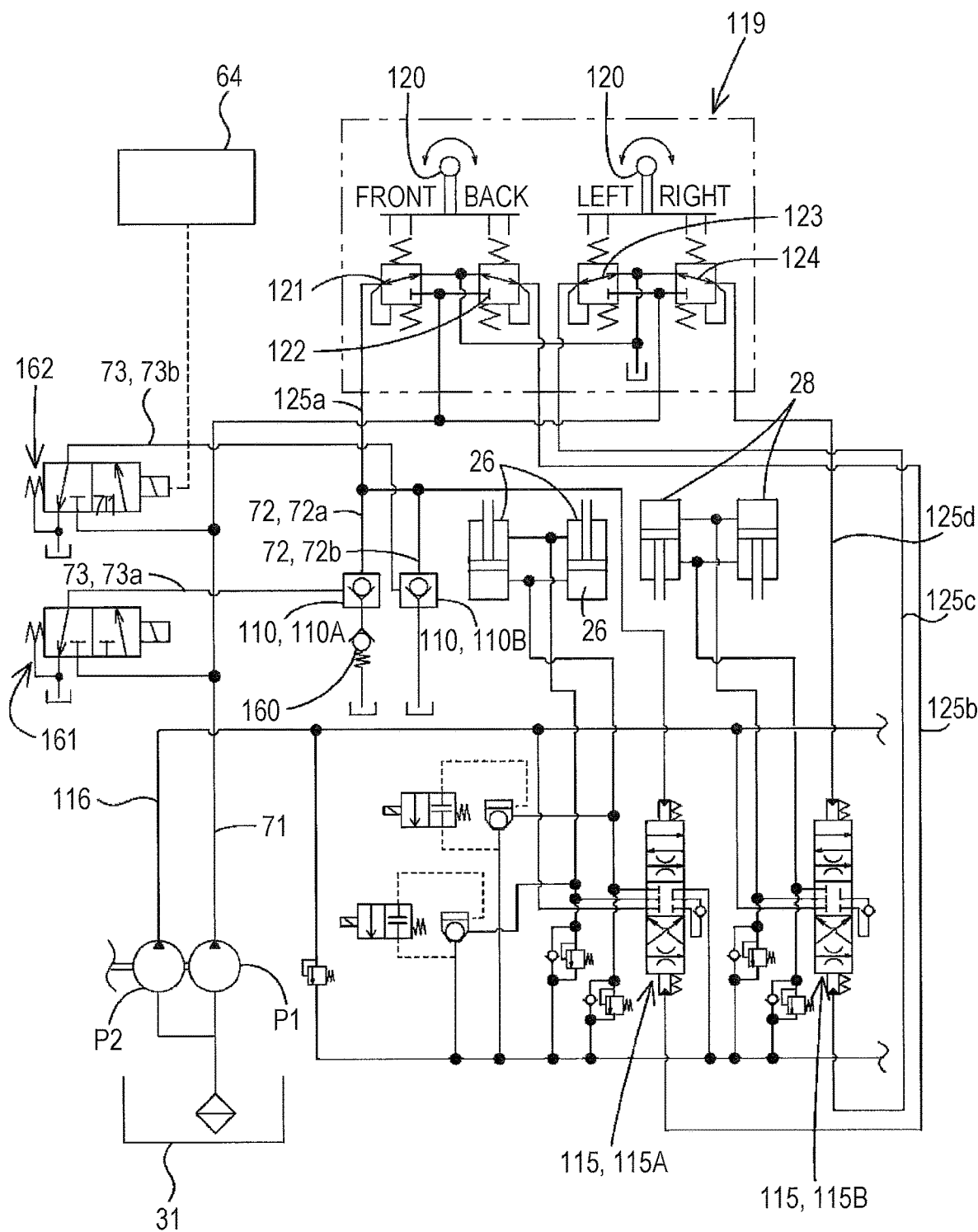
FIG. 9 is a diagram illustrating a hydraulic system (hydraulic circuit) according to a seventh embodiment.

A seventh embodiment is a modification of the hydraulic system. FIG. 9 illustrates modified parts of the hydraulic system of the seventh embodiment as comparable to the sixth embodiment. Other parts of the seventh embodiment that are not shown in FIG. 9 are similar to those in the sixth embodiment.

As illustrated in FIG. 9, a plurality of second oil passages 72 are connected to a first oil passage (first operation oil passage) 125a. In the present embodiment, two second oil passages 72 are connected to the first operation oil passage 125a.

Of the two second oil passages 72, a pilot check valve 110 is connected to one second oil passage 72a, and a pilot check valve 110 is also connected to the other second oil passage 72b. A check valve 160 that can change set pressure (differential pressure) is provided in the second oil passage 72a.

For convenience of description, the pilot check valve 110 that is connected to the second oil passage 72a is hereinafter referred to as a first pilot check valve 110A, and the pilot check valve 110 that is connected to the second oil passage 72b is hereinafter referred to as a second pilot check valve 110B. Furthermore, a third oil passage 73 that is connected to the first pilot check valve 110A is hereinafter referred to as an oil passage 73a, and a third oil passage 73 that is connected to the second pilot check valve 110B is hereinafter referred to as an oil passage 73b.

A switching valve 161 is connected to the oil passage 73a, and a switching valve 162 is connected to the oil passage 73b. A fourth switching valve (the switching valve 161 and the switching valve 162) is connected to a discharge oil passage 71 that is connected to a first hydraulic pump P1. Each of the switching valve 161 and the switching valve 162 is a two-position switch-over valve whose position can be switched between a first position and a second position. Therefore, by switching the switching valve 161 and the switching valve 162, the pressure of hydraulic oil that acts on the first pilot check valve 110A and the second pilot check valve 110B (a flow amount of hydraulic oil flowing through the third oil passage 73) can be changed. That is, the switching valve 161 and the switching valve 162 are a first actuating part that can change the pressure of the hydraulic oil that acts on the pilot check valves 110.

The first actuating part (the switching valve 161 and the switching valve 162) can be switched by a control device 64 or the like. For example, a switch or the like that can be switched among three positions is connected to the control device 64. In a case where the switch is at a first position, the control device 64 excites a solenoid of the switching valve 161 and demagnetizes a solenoid of the switching valve 162. This causes the switching valve 161 to be at the second position and causes the switching valve 162 to be at the first position, and therefore part of hydraulic oil in the first operation oil passage 125a can be discharged by the first pilot check valve 110A. In a case where the switch is at a second position, the control device 64 excites the solenoid of the switching valve 162 and demagnetizes the solenoid of the switching valve 161. This causes the switching valve 161 to be at the first position and causes the switching valve 162 to be at the second position, and therefore part of the hydraulic oil in the first operation oil passage 125a can be discharged by the second pilot check valve 110B. In a case where the switch is at a third position, the switching valve 161 and the switching valve 162 are at the first position.

Therefore, the pressure of the hydraulic oil that acts on the first operation oil passage 125a (a flow amount of hydraulic oil flowing through the third oil passage 73) can be changed by the first pilot check valve 110A, the second pilot check valve 110B, and the check valve 160. Note that the number of pilot check valves 110, the number of check valves 160, and the number of switching valves 161 and 162 are not limited to the ones described in the embodiment. Although the plurality of second oil passages 72 are provided in the first operation oil passage 125a, the second oil passages 72 may be provided in a different oil passage.

Eighth Embodiment

Figure 10:
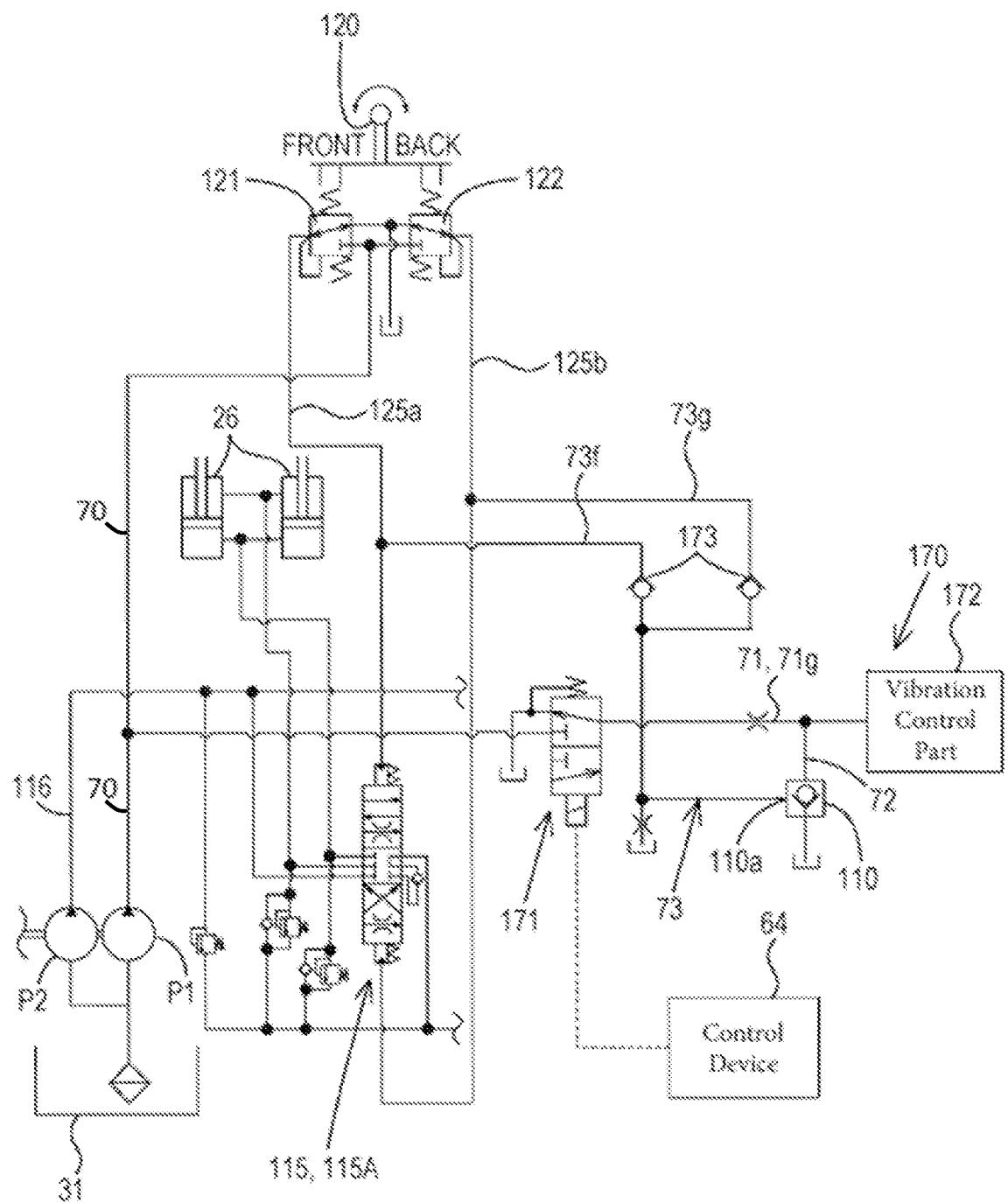
FIG. 10 is a diagram illustrating a hydraulic system (hydraulic circuit) according to an eighth embodiment.

An eighth embodiment is a modification of the hydraulic system. FIG. 10 illustrates modified parts of the hydraulic system of the eight embodiment as comparable to the sixth embodiment. Other parts of the eight embodiment that are not shown in FIG. 10 are similar to those in the sixth embodiment.

As illustrated in FIG. 10, a base oil passage 70 connects a first hydraulic pump P1 and remote control valves 121 and 122. A first oil passage 71 branches off from the base oil passage 70 and includes a seventh supply passage 71g that connects a ride control device 170 and the first hydraulic pump P1. The ride control device 170 is a device that performs a vibration control operation for suppressing a pressure fluctuation of a hydraulic actuator. In the present embodiment, the ride control device 170 is a device that controls vibration of a lift cylinder 26 (a boom 22L and a boom 22R). The ride control device 170 includes a vibration control switching valve 171 and a vibration control part 172 that performs a vibration control operation. The vibration control switching valve 171 is a two-position switch-over valve whose position can be switched between a first position and a second position. The vibration control switching valve 171 can be switched by a control device 64 or the like. For example, a switch or the like is connected to the control device 64, and in a case where the switch is turned on, the control device 64 excites a solenoid of the vibration control switching valve 171 so that the vibration control switching valve 171 is switched to the second position. In a case where the switch is turned off, the control device 64 demagnetizes the solenoid of the vibration control switching valve 171 so that the vibration control switching valve 171 is switched to the first position. In a case where the vibration control switching valve 171 is at the second position, hydraulic oil acts on the vibration control part 172, thereby causing the vibration control part 172 to control vibration of the lift cylinder 26. In a case where the vibration control switching valve 171 is at the first position, hydraulic oil does not act on the vibration control part 172, and therefore vibration control of the lift cylinder 26 by the vibration control part 172 stops.

A second oil passage 72 is connected to the seventh supply passage 71g. A pilot check valve 110 is connected to an intermediate part of the second oil passage 72. A third oil passage 73 is connected to the pilot check valve 110. The third oil passage 73 has a sixth flow passage 73f that is connected to a first operation oil passage 125a and a seventh flow passage 73g that is connected to a second operation oil passage 125b. A check valve 173 is connected to intermediate parts of the sixth flow passage 73f and the seventh flow passage 73g. The sixth flow passage 73f and the seventh flow passage 73g merge with each other, and a merged side thereof is connected to a pressure receiving part 110a. Note that a high-pressure selection valve that selects a higher pressure may be used instead of the check valve 173.

In the eighth embodiment, a first hydraulic device is the ride control device 170, and a first operating valve is remote control valves 121 and 122. Therefore, an operation of controlling vibration of the lift cylinder 26 can be performed by switching the vibration control switching valve 171, and the vibration control operation can be released in a case where an operation lever 120 is operated.

Ninth Embodiment

Figure 11:
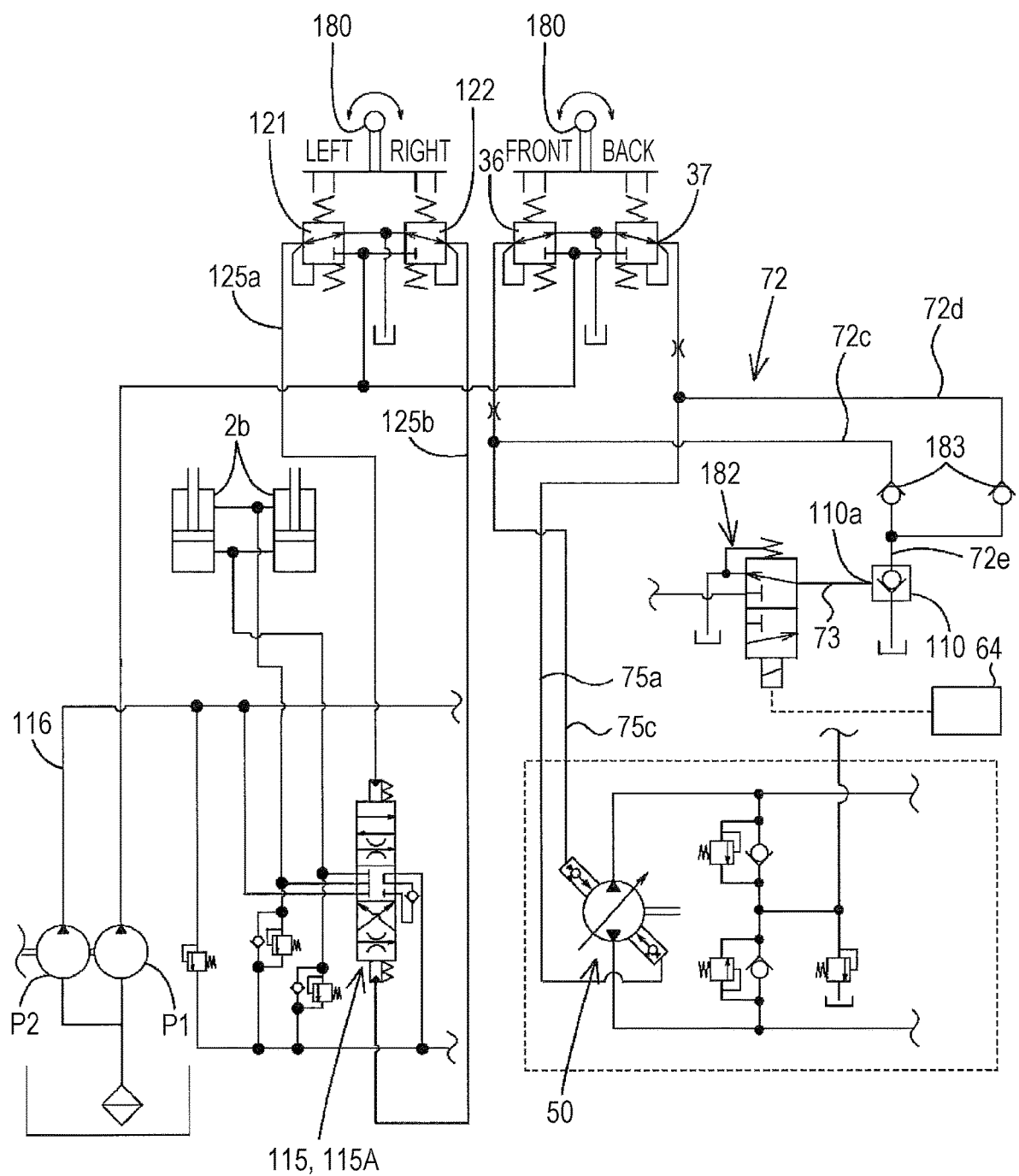
FIG. 11 is a diagram illustrating a hydraulic system (hydraulic circuit) according to a ninth embodiment.

A ninth embodiment is a modification of the hydraulic system. FIG. 11 illustrates modified parts of the hydraulic system of the ninth embodiment as comparable to the ninth embodiment. Other parts of the ninth embodiment that are not shown in FIG. 11 are similar to those in the above embodiments and the like.

As illustrated in FIG. 11, the hydraulic system includes an operation device 181 that can perform both a travelling operation and a work operation by a single operating member 180. The operation device 181 has a remote control valve for forward travelling 36, a remote control valve for backward travelling 37, a remote control valve for downward movement 121, and a remote control valve for upward movement 122. The remote control valve 36 and the remote control valve 37 are connected to an HST pump 50, and the remote control valve 121 and the remote control valve 122 are connected to a first operation control valve 115.

Specifically, the remote control valve 36 is connected to the HST pump 50 via a first operation oil passage 75a. The remote control valve 37 is connected to the HST pump 50 via a third operation oil passage 75c. The remote control valve 121 is connected to a first operation control valve 115A via a first operation oil passage 125a. The remote control valve 122 is connected to the first operation control valve 115A via a second operation oil passage 125b. For convenience of description, operation oil passages of a travelling system (the first operation oil passage 75a and the third operation oil passage 75c) are hereinafter referred to as a first travelling oil passage 75a and a second travelling oil passage 75c.

A second oil passage 72 is connected to the first travelling oil passage 75a and the second travelling oil passage 75c. The second oil passage 72 has an oil passage 72c that is connected to the first travelling oil passage 75a, an oil passage 72d that is connected to the second travelling oil passage 75c, and an oil passage 72e into which the oil passage 72c and the oil passage 72d merge. A check valve 183 is provided in the oil passage 72c and the oil passage 72d.

A pilot check valve 110 is connected to the oil passage 72e. A switching valve (third switching valve) 182 is connected to a third oil passage 73 that is connected to the pilot check valve 110. The switching valve 182 is a two-position switch-over valve whose position can be switched between a first position and a second position. Therefore, the pressure of the hydraulic oil that acts on the pilot check valve 110 can be changed by switching the switching valve 182. The switching valve 182 is a first actuating part.

The switching valve 182 can be switched by a control device 64 or the like. For example, a switch or the like is connected to the control device 64. In a case where the switch is turned on, the control device 64 excites a solenoid of the switching valve 182. This causes the switching valve 182 to be at the second position, and therefore part of hydraulic oil in the operation oil passages of the travelling system (the first operation oil passage 75a and the third operation oil passage 75c) can be discharged by the first pilot check valve 110. In a case where the switch is turned off, the control device 64 demagnetizes the solenoid of the switching valve 182. In this way, the HST pump 50 can be operated as usual by an operation of the operating member 180.

The embodiments disclosed herein are given only for illustration and should not be construed as being restrictive. The scope of the present invention is indicated not by the above description but by the claims, and it is intended that meanings equivalent to the scope of the claims and all changes within the scope are encompassed within the embodiments of the present invention. In the above embodiments, the first actuating part 61 and the second actuating part 62 are two-position switch-over valves. Instead, the first actuating part 61 and the second actuating part 62 may be proportional valves. In the above embodiments, the travelling motor 51 and the braking mechanism 52 are described as hydraulic devices. However, the hydraulic devices may be any devices that work by the pressure of hydraulic oil. In the above embodiments, a travelling motor is a motor that is switched between the first speed and the second speed (motor whose travelling state is changed). However, the stages between which the travelling motor is switched is not limited to the first speed and the second speed. In the above embodiments, hydraulic oil is discharged to a hydraulic oil tank. However, hydraulic oil may be discharged to a different place. That is, an oil passage for discharging hydraulic oil may be connected to a place other than a hydraulic oil tank. For example, an oil passage for discharging hydraulic oil may be connected to a sucking part of a hydraulic pump (part that sucks in hydraulic oil) or may be connected to a different part.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic system of a work machine, comprising:
a hydraulic pump to discharge hydraulic oil;
a remote control valve connected to the hydraulic pump via a base oil passage to generate a pilot pressure of the hydraulic oil in accordance with an operation of an operating member;
a first oil passage which branches off from the base oil passage to be connected to the hydraulic pump and to which the hydraulic oil is to be supplied from the hydraulic pump;
a second oil passage which is connected to the first oil passage and via which the hydraulic oil in the first oil passage is to be discharged;
a vibration control switching valve provided on the first oil passage and having a first position at which a part of the first oil passage is cut off at the vibration control switching valve and a second position at which hydraulic oil from the hydraulic pump is supplied to the second oil passage via the first oil passage, the vibration control switching valve having a solenoid to change a position of the vibration control valve between the first position and the second position based on magnetization of the solenoid;
a pilot check valve provided in the second oil passage and having a pilot port to receive the pilot pressure of hydraulic oil, the pilot pressure being controlled to be a pressure lower than a fourth pressure threshold when pressure of the hydraulic oil supplied from the hydraulic oil is equal to or higher than a first pressure threshold, the pilot check valve being closed to stop discharging the hydraulic oil in the first oil passage through the second oil passage while the pilot pressure is lower than the fourth pressure threshold, the pilot check valve being opened such that the hydraulic oil in the first oil passage is discharged through the second oil passage while the pilot pressure is higher than or equal to the fourth pressure threshold;
a hydraulic actuator having a rod chamber and a bottom chamber;
a first additional oil passage connected to the bottom chamber;
a second additional oil passage connected to the rod chamber;
an operation control valve connected to the first additional oil passage and the second additional oil passage and having a pressure receiving part to control a flow of hydraulic oil in the first additional oil passage and a flow of hydraulic oil in the second additional oil passage to control the hydraulic actuator based on a pressure of the hydraulic oil applied to the pressure receiving part;
an operation oil passage connecting the remote control valve and the pressure receiving part, the pilot pressure generated by the remote control valve being applied to the pressure receiving part; and
a third oil passage branching off from the operation oil passage and being connected to the pilot port, the remote control valve being configured to control an amount of hydraulic oil flowing to the third oil passage.

2. A work machine comprising the hydraulic system according to claim 1.

3. The hydraulic system according to claim 1, further comprising:
an additional hydraulic pump connected to the first additional oil passage and the second additional oil passage via the operation control valve and configured to discharge the hydraulic oil to the first additional oil passage and the second additional oil passage.

4. The hydraulic system according to claim 1, wherein the hydraulic actuator includes a lift cylinder.

5. The hydraulic system according to claim 1, further comprising:
a discharging oil passage connected to the third oil passage between the pilot port and the operation oil passage, the hydraulic oil flowing to the third oil passage being discharged through the discharging oil passage; and
a throttle provided in the discharging oil passage.

* * * * *